United States Patent
Patil et al.

(10) Patent No.: US 12,410,835 B2
(45) Date of Patent: Sep. 9, 2025

(54) LUBRICANT DRAINING BEARING ASSEMBLIES

(71) Applicant: General Electric Company, Schenectady, NY (US)

(72) Inventors: Pravin Ganpati Patil, Bengaluru (IN); Ravindra Shankar Ganiger, Bengaluru (IN); Santosh Kumar Potnuru, Bengaluru (IN); Santosh Kumar Prasad, Bengaluru (IN); Pradeep Hemant Sangli, Bengaluru (IN); Rajesh Kumar, Bengaluru (IN); Mark L. Hopper, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 194 days.

(21) Appl. No.: 18/313,145

(22) Filed: May 5, 2023

(65) Prior Publication Data
US 2024/0318688 A1    Sep. 26, 2024

(30) Foreign Application Priority Data
Mar. 20, 2023    (IN) .............................. 202311018804

(51) Int. Cl.
*F16C 33/46* (2006.01)
*F16C 33/66* (2006.01)

(52) U.S. Cl.
CPC ...... *F16C 33/4623* (2013.01); *F16C 33/6681* (2013.01); *F16C 2360/23* (2013.01)

(58) Field of Classification Search
CPC .............. F16C 33/4605; F16C 33/4623; F16C 33/4629; F16C 33/4635; F16C 33/6681; F16C 2360/23; F01D 25/16; F01D 25/18
See application file for complete search history.

(56) References Cited

U.S. PATENT DOCUMENTS 2,838,348 A * 6/1958 Clarence ............. F16C 33/6681
                                                          384/466
5,749,660 A    5/1998 Dusserre-Telmon et al.
(Continued)

FOREIGN PATENT DOCUMENTS

| JP | 09151946 A | * | 6/1997 | .......... F16C 33/4605 |
| JP | H11336767 A | * | 12/1999 | |
| JP | 2012041940 A | * | 3/2012 | .......... F16C 33/4623 |

OTHER PUBLICATIONS

Machine Translation of JP-09151946-A (Year: 1997).*
Machine Translation of JP-H11336767-A (Year: 1999).*
Machine Translation of JP-2012041940-A (Year: 2012).*

*Primary Examiner* — Alan B Waits
(74) *Attorney, Agent, or Firm* — Venable LLP; Andrew W. Bradshaw; Michele V. Frank

(57) ABSTRACT

Lubricant draining bearing assemblies are disclosed. An example apparatus includes a first race, a second race, roller bearings positioned between the first race and the second race, and a cage positioned around the roller bearings between the first race and the second race, the cage including a first radial surface, a second radial surface, and an axial surface, the first radial surface facing the first race, the second radial surface facing the second race, the axial surface facing away from the roller bearings, the cage including at least one conduit extending between the first radial surface and at least one of the second radial surface or the axial surface, the conduit defining a flow path for a fluid out of a cavity between the first race, the roller bearings, and the cage.

20 Claims, 22 Drawing Sheets

(56) References Cited

U.S. PATENT DOCUMENTS

| | | | |
|---|---|---|---|
| 8,197,142 | B2 | 6/2012 | Murata et al. |
| 8,562,224 | B2 | 10/2013 | Duffy |
| 8,672,555 | B2 | 3/2014 | Gardelle et al. |
| 8,979,383 | B2 | 3/2015 | Carter et al. |
| 9,022,661 | B2 * | 5/2015 | Hayashi .............. F16C 33/6681 384/470 |
| 9,033,581 | B2 | 5/2015 | Carter et al. |
| 9,841,056 | B2 | 12/2017 | Snow et al. |
| 9,957,839 | B2 | 5/2018 | Antunes et al. |
| 2013/0087413 | A1 * | 4/2013 | Carter ................ F16C 33/3843 384/470 |

* cited by examiner

LUBRICANT DRAINING BEARING ASSEMBLIES

RELATED APPLICATION

This patent claims the benefit of Indian Provisional Patent Application No. 202311018804, which was filed on Mar. 20, 2023. Indian Provisional Patent Application No. 202311018804 is hereby incorporated herein by reference in its entirety. Priority to Indian Provisional Patent Application No. 202311018804 is hereby claimed.

FIELD OF THE DISCLOSURE

This disclosure relates generally to bearings and, more particularly, to lubricant draining bearing assemblies.

BACKGROUND

A turbine engine generally includes a fan and a core section arranged in flow communication with one another. The turbine engine includes bearing assemblies to facilitate rotation between relative parts. The bearing assemblies are lubricated to facilitate rotation of the bearing elements.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

In general, the same reference numbers will be used throughout the drawings and accompanying written description to refer to the same or like parts. The figures are not substantially to scale.

DETAILED DESCRIPTION

Figure 1:
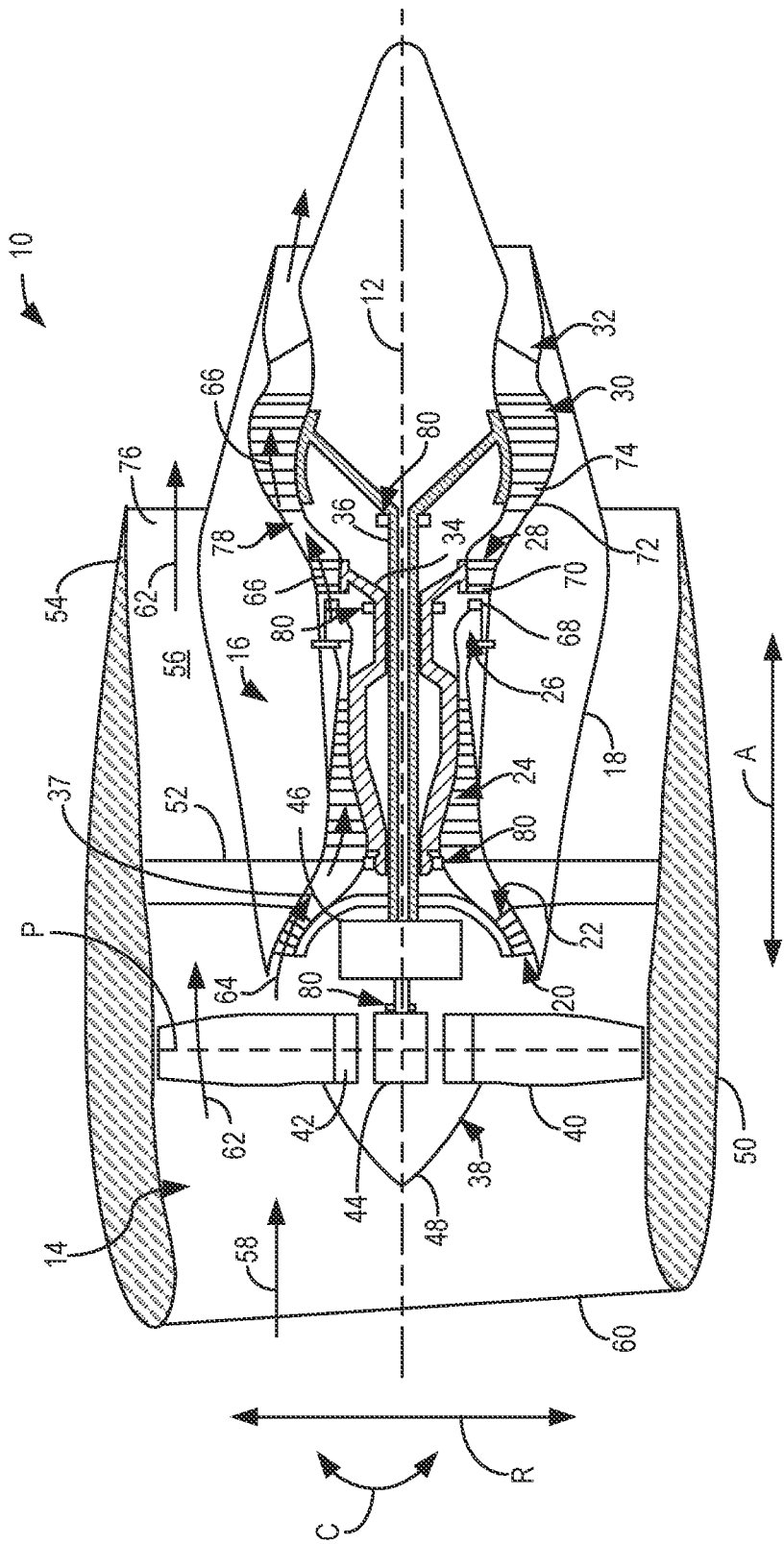
FIG. 1 is a schematic, cross-sectional view of a turbine engine, taken along a centerline axis of the turbine engine, according to the present disclosure.

As used herein, connection references (e.g., attached, coupled, connected, fixed, joined, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher," when applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such terms may additionally, or alternatively, be understood as relative to minimum allowable speeds, pressures, or temperatures, or minimum or maximum allowable speeds, pressures, or temperatures relative to normal, desired, steady state, etc., operation of the engine.

As used herein, the terms "axial" and "axially" refer to directions and orientations that extend substantially parallel to a centerline of the turbine engine and/or a bearing assembly. Moreover, the terms "radial" and "radially" refer to directions and orientations that extend substantially perpendicular to the centerline (e.g., a rotational axis) of the turbine engine and/or the bearing assembly. In addition, as used herein, the terms "circumferential" and "circumferentially" refer to directions and orientations that extend arcuately about the centerline of the turbine engine and/or the bearing assembly.

As used herein, the terms "roller bearing" and "rolling element" encompasses spherical roller bearings, cylindrical roller bearings, tapered roller bearings, and the like.

During engine operation, as described below, the low pressure shaft and the high pressure shaft rotate at high speeds and experience high axial loading. The high speeds and loads generate high bearing temperatures (e.g., greater than about 1000 British thermal units (BTUs)/minute) in the bearings that facilitate rotation of the shafts. That is, as the speed and/or the load on the shaft increases, the temperature of the bearing increases as well. The higher bearing temperatures require increased amounts of lubricant (e.g., oil) to cool the bearings and the hardware located in and around a sump area (e.g., the forward cavity and the aft cavity surrounding the bearing assembly). The requirement for more lubricant impacts heat load management of the engine because, for example, the required lubricant defines the lubricant line sizing and the heat exchanger sizing, among other components. Higher lubricant volumes required to cool the bearing assemblies also leads to increases in viscous heat generation in the bearings.

In order to maintain low temperatures and/or lower the temperatures at the bearings, while not increasing lubricant volumes, the lubricant drains of the present disclosure are provided in the bearing assemblies to remove lubricant from the bearing assemblies and allow for continuous and/or predetermined flows of lubricant into and out of the bearing assembly. As a result, heat can be continuously or constantly taken from the bearing assembly and drained to one or more sumps or cavities in the system. By draining the lubricant from the bearing assemblies, the temperature of the bearings may be reduced, which enables smaller lubricant lines and/or heat exchangers to be associated with the bearing assemblies. Lubricant drains also reduce the viscous heat generation in the bearings by reducing the residence time of the lubricant within the bearing assembly.

Disclosed bearing assemblies include an inner race (e.g., an inner ring), an outer race (e.g., an outer ring), roller bearings positioned between the inner race and the outer race, and a bearing cage positioned around the roller bearings. The bearing cage includes one or more conduits that define a flow path to drain a portion of the lubricant that is positioned in a cavity defined between adjacent roller bearings, the inner race, and the bearing cage. A first orifice of the conduit (e.g., an inlet, an outlet) is defined in an inner radial surface of the bearing cage and faces the cavity or cage landings of the inner race. A second orifice (e.g., an inlet, an outlet) of the conduit is defined in an outer radial surface or an outer axial surface of the bearing cage. The conduit may convey the lubricant itself or another fluid (e.g., air) that helps move the lubricant out of the cavity to another area of the bearing assembly or out of the bearing assembly.

An inner radial surface of the bearing cage and/or the cage landings of the inner race may include different heights or depths to control the flow of the lubricant. For example, different depths of the bearing cage between the cage landings in the axial direction adjust a size of the cavity and, thus, the amount of lubricant that remains in the cavity. Additionally or alternatively, the cage may include grooves that guide the lubricant from the cavity to a circumferential portion between the cage landing and the bearing cage where the lubricant can enter the conduit to be moved to a different area of the bearing assembly or out of the bearing assembly.

A size and/or a shape of the conduit helps control a rate at which the lubricant is drained from the cavity. For example, the conduit may include a taper to create a pressure difference that pulls the lubricant through the conduit or pulls air through the conduit to facilitate removal of the lubricant from the cavity. Additionally or alternatively, the cross-sectional area may correlate with a desired rate at which the lubricant is to be drained from the cavity.

The bearing assemblies drain lubricant to reduce residence time of the oil in the cavity and, in turn, reduce the viscous and frictional heat generation encountered by the lubricant. The reduced residence time allows for a faster turnover of the lubricant in the cavity, which allows the lubricant within the cavity to remain below a temperature threshold. The bearing assemblies of the present disclosure reduce the heat generated by the bearing by about twenty percent to about thirty percent, inclusive of the end points. The bearing assemblies of the present disclosure allow for increased shaft speeds, reduced oil supply to the bearings, reduced heat exchanger sizing, reduced lubricant supply line sizing, etc., as compared to bearing assemblies without such lubricant drains.

FIG. 1 shows a schematic cross-sectional view of a gas turbine engine 10. The gas turbine engine 10 defines an axial direction A extending parallel to a longitudinal, centerline axis 12 of the gas turbine engine 10, a radial direction R, and a circumferential direction C extending about the axial direction A. The gas turbine engine 10 includes a fan section 14 and a core turbine engine 16 disposed downstream from the fan section 14.

The core turbine engine 16 depicted in the example of FIG. 1 includes an outer casing 18 that defines an annular inlet 20. The core turbine engine 16 includes, in serial flow relationship, a compressor section including a low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. Accordingly, the LP shaft 36 and the HP shaft 34 are each rotary components, rotating about the longitudinal, centerline axis 12 in the circumferential direction C during operation of the gas turbine engine 10.

In order to support such rotary components, the gas turbine engine 10 includes a plurality of bearing assemblies 80 attached to various structural components within the gas turbine engine 10. For example, the bearing assemblies 80 may be located to facilitate rotation of the LP shaft 36 and the HP shaft 34. The bearing assemblies 80 may additionally, or alternatively, be located at any desired location along the LP shaft 36 and the HP shaft 34. The bearing assemblies 80 may be used in combination with oil-lubricated bearing assemblies, as will be discussed in more detail herein.

Referring still to FIG. 1, the fan section 14 includes a fan 38 having a plurality of fan blades 40 spaced apart and coupled to a disk 42. The disk 42 is covered by a hub 48. As depicted, the fan blades 40 extend radially outwardly from the disk 42 generally along the radial direction R. Each fan blade 40 is rotatable relative to the disk 42 about a pitch axis P because the fan blades 40 are operatively coupled to a pitch change mechanism 44. The fan blades 40, the disk 42, and the pitch change mechanism 44 are together rotatable about the longitudinal, centerline axis 12 by the LP shaft 36 across a power gearbox 46. The power gearbox 46 includes a plurality of gears for adjusting the rotational speed of the fan 38 relative to the LP shaft 36. More particularly, the fan section 14 includes a fan shaft rotatable by the LP shaft 36 across the power gearbox 46. Accordingly, the fan shaft may also be considered to be a rotary component and is similarly supported by a bearing assembly 80.

The fan section 14 includes an annular fan casing or outer nacelle 50 that circumferentially surrounds the fan 38 and/or at least a portion of the core turbine engine 16. The outer nacelle 50 is supported relative to the core turbine engine 16 by a plurality of circumferentially-spaced outlet guide vanes 52. A downstream section 54 of the outer nacelle 50 extends over an outer portion of the core turbine engine 16 and defines a bypass airflow passage 56 between the downstream section 54 and the outer portion of the core turbine engine 16.

During operation of the gas turbine engine 10, a volume of air 58 enters the gas turbine engine 10 through an inlet 60 of the outer nacelle 50 and/or the fan section 14. As the volume of air 58 passes across the fan blades 40, a first portion of air 62 of the air 58 is directed or routed into the bypass airflow passage 56 and a second portion of air 64 of the air 58 is directed or routed into a core air flow path 37, or, more specifically, into the LP compressor 22. The ratio between the first portion of air 62 and the second portion of air 64 is known as a bypass ratio. The pressure of the second portion of air 64 is then increased as it is routed through the high pressure (HP) compressor 24 and into the combustion section 26, where it is mixed with fuel and burned to generate combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before the first portion of air 62 is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although depicted and described in conjunction with the gas turbine engine 10 of FIG. 1, aspects of the present disclosure may be incorporated into any other suitable gas turbine engine. For example, aspects of the present disclosure may be incorporated into a turbo fan engine (e.g., similar to the gas turbine engine 10 of FIG. 1), a turboprop engine, a turboshaft engine, a turbojet engine, and/or a turbine generator.

The gas turbine engine 10 depicted in FIG. 1 is by way of example only. In other examples, the gas turbine engine 10 may have a different configuration. For example, the fan 38 may be configured differently (e.g., as a fixed pitch fan) and further may be supported using another fan frame configuration. Moreover, in other examples, another number and/or configuration of compressors, turbines, shafts, or a combination thereof may be provided. In still other examples, aspects of the present disclosure may be incorporated into another turbine engine, such as turbofan engines, propfan engines, turbojet engines, turboprop, and/or turboshaft engines. Further, in still other examples, aspects of the present disclosure may be incorporated into another turbomachine, including, without limitation, a steam turbine, a centrifugal compressor, a turbocharger, stationary turbomachinery, other power generation turbomachines, or other rotating equipment.

Figure 2A:
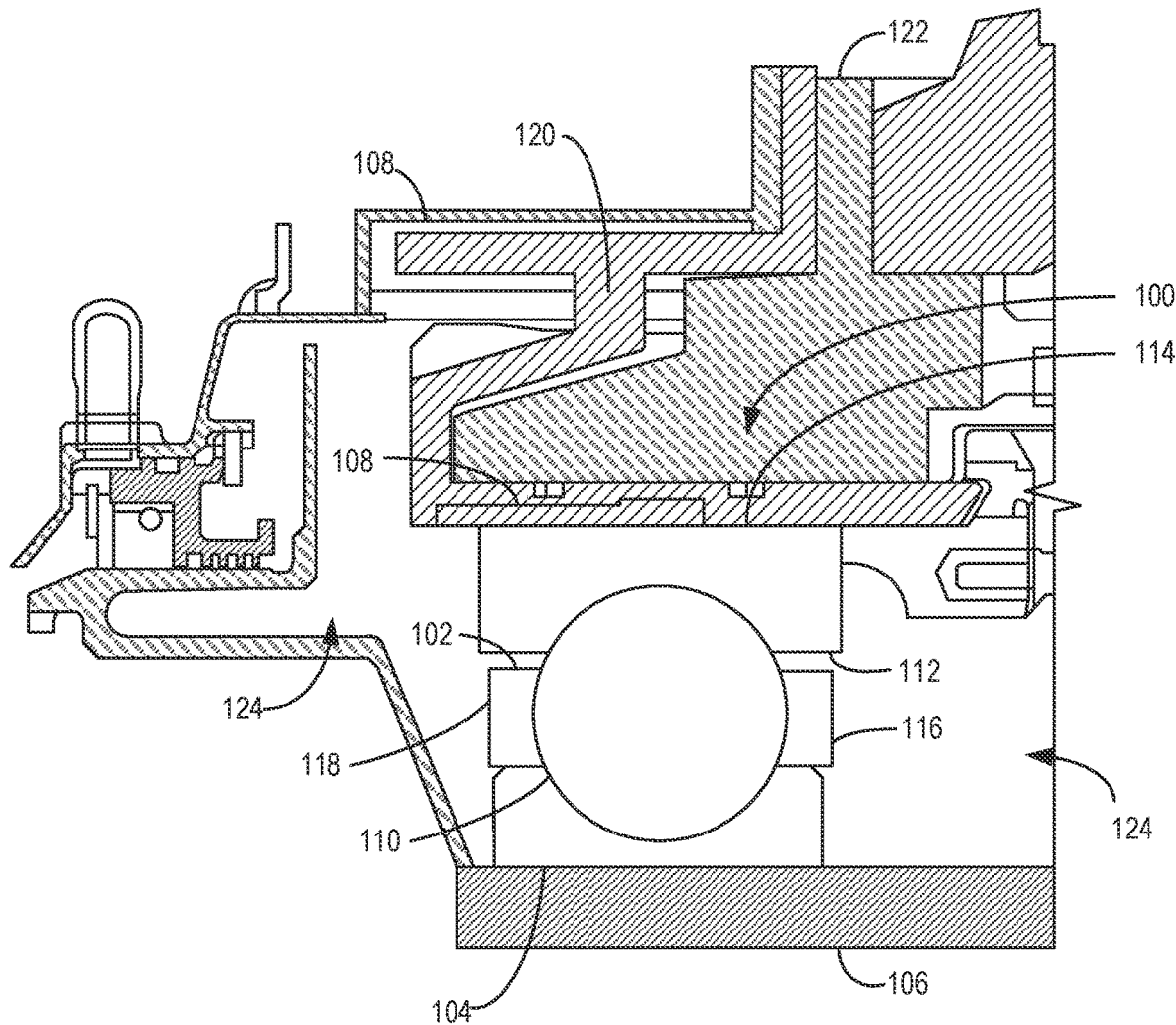
FIG. 2A is a schematic, cross-sectional view of a bearing assembly for the turbine engine of FIG. 1.
Figure 2B:
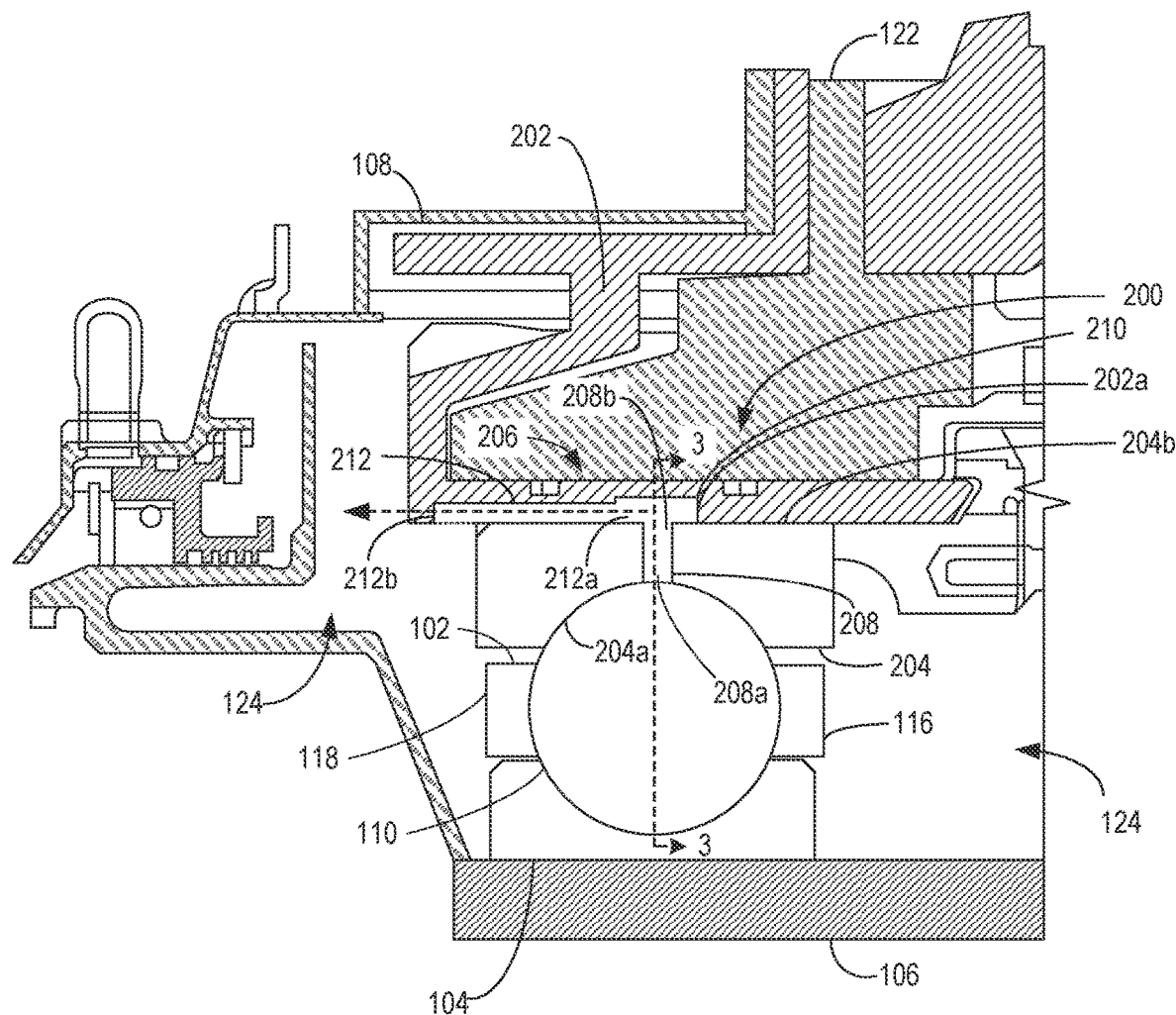
FIG. 2B is another schematic, cross-sectional view of a bearing assembly for the turbine engine of FIG. 1.

FIGS. 2A-2B illustrate bearing assemblies 100, 200 including a cage 102 that facilitates lubricant drainage from cavities defined between adjacent roller bearings, an inner race 104, and the cage 102. The bearing assembly 100 of FIG. 2A and/or the bearing assembly 200 of FIG. 2B can implement the bearing assembly 80 of FIG. 1. In FIGS. 2A-2B, the bearing assemblies 100, 200 support rotation of a shaft 106 (e.g., the HP shaft 34 and/or the LP shaft 36 of FIG. 1) with respect to another component 108, such as another component of the gas turbine engine 10 of FIG. 1.

Referring now to FIG. 2A, the bearing assembly 100 includes a roller bearing 110 (also referred to herein as a rolling element) positioned between the inner race 104 (e.g., an inner ring), and an outer race 112 (e.g., an outer ring) in a bearing housing 114. The roller bearing 110 is one of a plurality of roller bearings spaced apart in a circumferential direction defined by the bearing assembly 100. The cage 102 is positioned around the roller bearing 110, as well as the other roller bearings, between the inner race 104 and the outer race 112. Specifically, the cage 102 includes a slot in which the roller bearing 110 is positioned and other, separate slots for the remainder of the plurality of roller bearings to maintain a separation between the roller bearings and evenly distribute the load that the roller bearings support. Accordingly, the slots defined by the cage 102 are defined intermittently in the circumferential direction between axial surfaces 116 (e.g., outer side surfaces) of the cage 102 to maintain relative positions of the roller bearings, such as the roller bearing 110.

The bearing assembly 100 may be coupled to the component 108 with a bearing housing 120. In some examples, the bearing housing 120 includes a damper housing 122. In such examples, the damper housing 122 is positioned radially outward of the bearing assembly 100 to provide a squeeze film damper (SFD) at the bearing assembly 100. The bearing assembly 100 is supplied with a lubricant, such as oil, between the inner race 104 and the outer race 112 to facilitate rotation of the roller bearing 110, the inner race 104, and the cage 102. For example, one or more lubricant passageways provide lubricant onto a riding surface of the roller bearing 110 defined by the inner race 104, as discussed in further detail below.

The cage 102 includes and/or forms lubricant drains to facilitate movement of the lubricant and/or removal of the lubricant from the bearing assembly 100. Specifically, the lubricant drains of the cage 102 guide the lubricant out of cavities defined between adjacent roller bearings (e.g., the roller bearing 110 and another roller bearing adjacent to the roller bearing 110 in the circumferential direction), the inner race 104, and the cage 102. The lubricant drains of the cage 102 may be uniformly or nonuniformly spaced around the circumference of the cage 102. For example, the lubricant drains are configured to cause the lubricant to flow to a different area of the bearing assembly 100 (e.g., onto a riding surface of the outer race 112) and/or out of the bearing assembly 100 and into a sump 124 proximate axial surfaces of the bearing assembly 100 (e.g., axial surfaces 116). Specifically, the lubricant drains of the cage 102 cause the lubricant to flow out of the bearing assembly 100 through one or more of the axial surface(s) 116, between the cage 102 and the inner race 104, and/or between the cage 102 and the outer race 112. As a result, the cage 102 helps the lubricant maintain flow and reduces churning of the lubricant in the cavities that would otherwise lead to increased viscous and frictional heat generation.

The sump 124 is in fluid connection with a lubricant treatment system (not shown). The lubricant treatment system may include a heat exchanger to maintain the temperature of the lubricant within a certain range. For example, the lubricant may generate and/or absorb heat in the bearing assembly 100 during operations, and the heat exchanger absorbs the heat from the lubricant to maintain certain material properties (e.g., a viscosity) of the lubricant. Advantageously, by reducing the heat generated and/or absorbed by the lubricant in the bearing assembly 100, the lubricant drains of the cage 102 enable a size of the heat exchanger and/or other components (e.g., a supply line) of the lubricant treatment system to be reduced. After being treated by the heat exchanger, the lubricant is recirculated to the bearing assembly 100. Specifically, the lubricant is fed into the bearing assembly 100 through one or more conduits in the inner race 104. Although, it should be understood that the lubricant may be provided to the bearing assembly 100 in a variety of ways. The lubricant drains of the cage 102 are illustrated and discussed in further detail below.

Referring now to FIG. 2B, the bearing assembly 200 is positioned in another example bearing housing 202 and includes another example outer race 204. The outer race 204 includes at least a portion of a lubricant drain 206 that may be used in combination with the lubricant drain of the cage 102, which will be discussed in further detail below. The lubricant drain 206 defines a passage that includes one or more holes 208, a groove 210, and one or more slots 212. The one or more holes 208 are located in the outer race 204. Each hole 208 extends radially outward from a hole inlet 208a to a hole outlet 208b. The hole 208 extends radially outward from an inner surface 204a of the outer race 204 to an outer surface 204b of the outer race 204. Although a single hole 208 is shown in FIG. 2B, multiple holes 208 may be provided in the outer race 204. The holes 208 may be uniformly or nonuniformly spaced around the circumference of the outer race 204.

The groove 210 is located in the bearing housing 202. The groove 210 is a groove formed in an inner surface 202a of the bearing housing 202. The groove 210 is an annular groove extending around the inner surface 202a about the centerline axis 12 (FIG. 1). The one or more slots 212 are located in the bearing housing 202. The one or more slots 212 are slots formed in the inner surface 202a of the bearing housing 202. Each slot 212 extends axially from an aft end to a forward end. Each slot 212 extends axially from a slot inlet 212a to a slot outlet 212b. Although a single slot 212 is shown in FIG. 2, multiple slots 212 may be provided in the bearing housing 202. The slots 212 may be uniformly or nonuniformly spaced around the circumference of the bearing housing 202.

Figure 3:
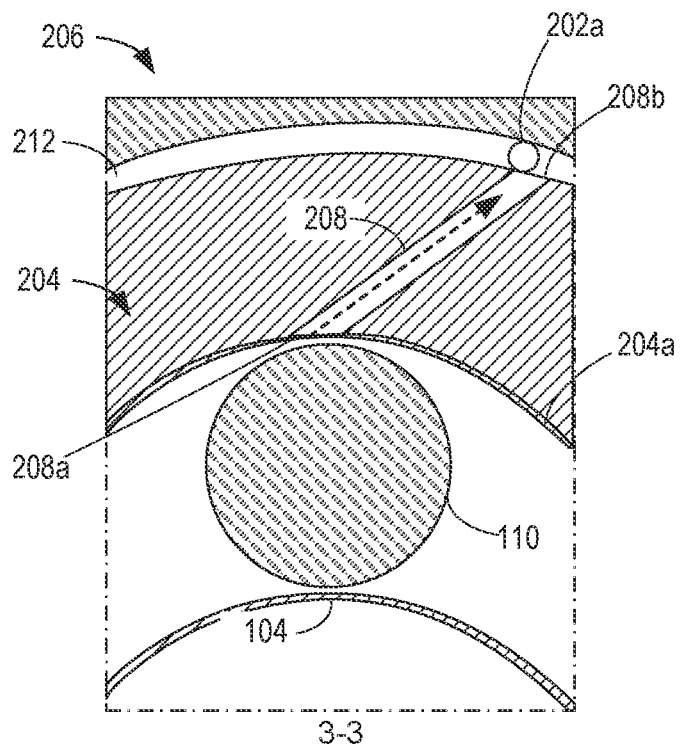
FIG. 3 is a schematic, cross-sectional view of the bearing assembly of FIG. 2B, taken along the section line 3-3 of FIG. 2B.

FIG. 3 illustrates a partial cross-sectional view of the bearing assembly 200 of FIG. 2B and the lubricant drain 206 taken through the section line 3-3 of FIG. 2B. As shown in FIG. 3, the hole 208 is inclined in a circumferential direction from the hole inlet 208a to the hole outlet 208b. Thus, the hole 208 extends radially outward (as shown in FIG. 2) and extends at an angle in the circumferential direction (FIG. 3). Although the circumferential incline is shown at an angle of about forty-five degrees with respect to the centerline axis 12 (FIG. 1), other angles are contemplated.

Figure 4:
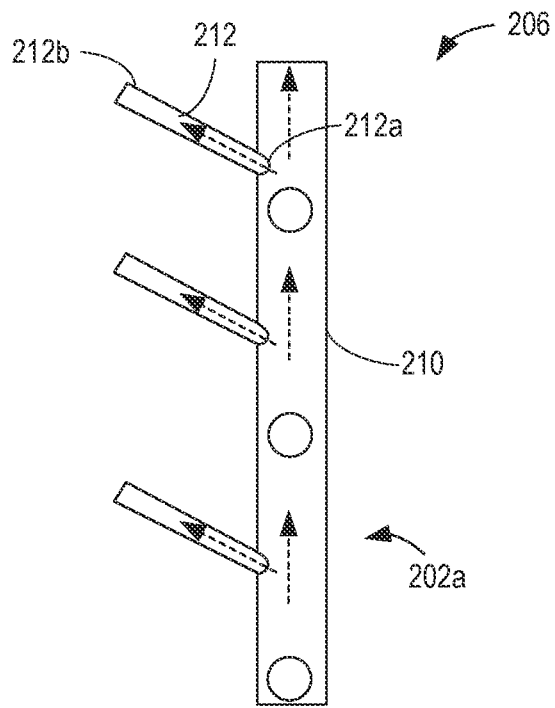
FIG. 4 is a schematic of a flow path of an example lubricant drain of the bearing assembly of FIG. 2B.

FIG. 4 illustrates a plan view of the inner surface 202a of the bearing housing 202. As mentioned, the groove 210 is an annular groove that extends around the inner surface 202a.

The groove 210 may extend three-hundred and sixty degrees (360°) about the centerline axis 12 (FIG. 1) such that the groove 210 is circular in shape in a forward view or an aft end view. The slots 212 extend at an angle in the circumferential direction from the slot inlet 212a to the slot outlet 212b. Although the circumferential incline is shown at an angle of about forty-five degrees with respect to the centerline axis 12 (FIG. 1), other angles are contemplated. For example, the angle may be between about zero degrees and about eighty degrees with respect to the centerline axis 12.

As shown in FIG. 3, each hole outlet 208b is offset circumferentially from an adjacent hole inlet 208a. In some examples, the hole outlet 208b and the hole inlet 208a may be circumferentially aligned. Accordingly, and referring to FIGS. 2B, 3, and 4, the lubricant drain 206 allows for lubricant to flow through the outer race 204 and to the sump 124. Due to the radial constraint of the bearing housing 202 (FIG. 2), the lubricant drain 206 changes direction to deposit lubricant in the sump 124. The overall trajectory of the lubricant drain 206 is in the axial direction and the radial direction. That is, the inlet (e.g., hole inlet 208a) of the lubricant drain 206 is radially inward and axially aft (also referred to as axially downstream) of the outlet (e.g., slot outlet 212b) of the lubricant drain 206. Thus, the passage defined by the lubricant drain 206 is a multi-directional passage. That is, the passage has a radially and circumferentially extending portion (e.g., hole 208), a circumferentially extending, annular portion (e.g., groove 210), and an axial and circumferentially extending portion (e.g., slot 212).

During operation, and referring to FIGS. 2A, 2B, 3, and 4, the lubricant is provided to the bearing assemblies 100, 200. The lubricant facilitates rotation of the roller bearing 110. To enable lubricant to continually flow through the bearing assembly 100, 200 and/or to allow used lubricant to flow from the bearing assembly 100, 200, the lubricant drain defined by the cage 102 and/or the lubricant drain 206 enables the lubricant to flow from the bearing assemblies 100, 200 to the sump 124 (FIGS. 2A and 2B). Referring to FIG. 2A, the lubricant exits the bearing assembly 100 at least one of (a) between the inner race 104 and the cage 102, (b) through one or more of the axial surface(s) 116 of the cage 102, and/or (c) between the cage 102 and the outer race 112. Referring to FIG. 2B, the lubricant exits the bearing assembly 200 through the hole inlet 208a, travels through the hole 208 to the hole outlet 208b. From the hole outlet 208b, the lubricant enters the annular groove 210. Once in the annular groove 210, the lubricant may exit through one or more of the slots 212 and into the sump 124.

Figure 5:
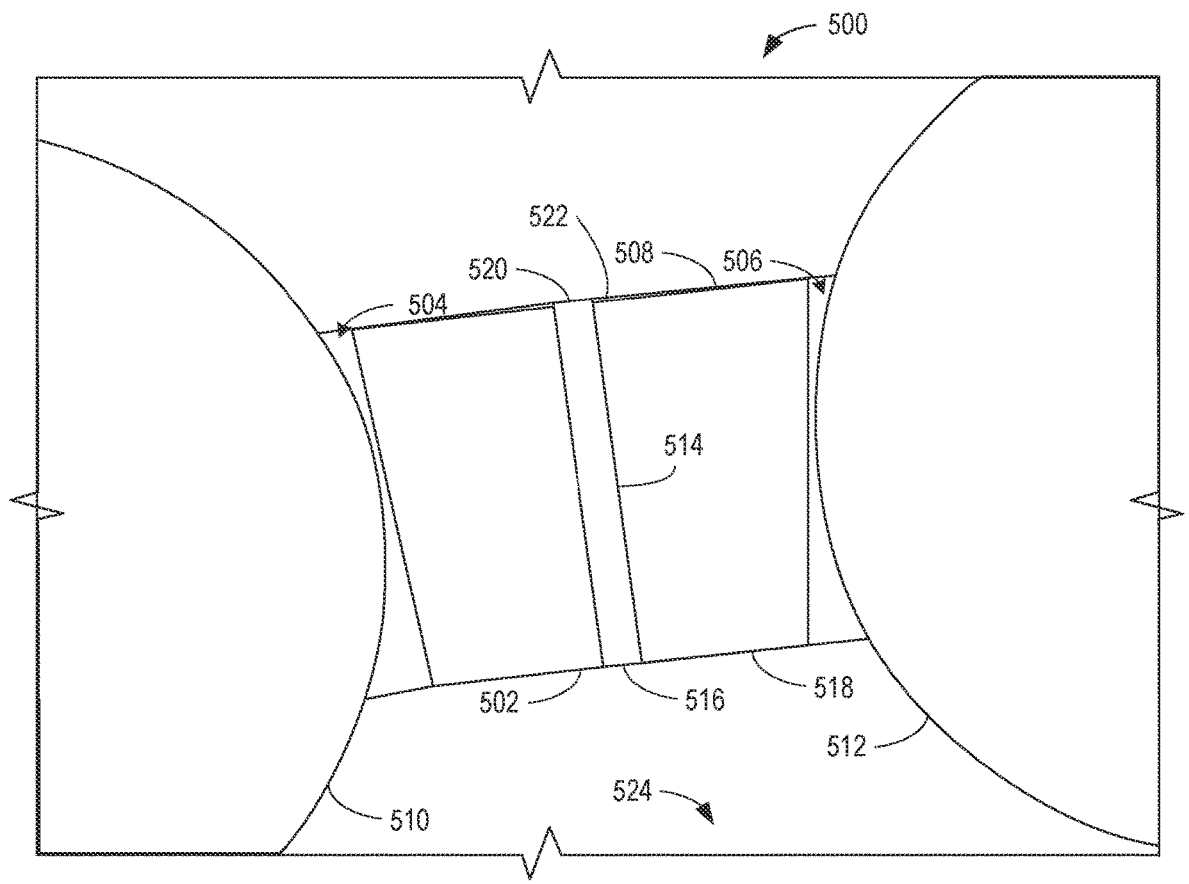
FIG. 5 is a schematic, axial cross-sectional view of a bearing assembly representative of the bearing assembly of FIG. 2A and/or the bearing assembly of FIG. 2B.
Figure 5:
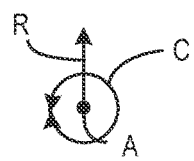

FIG. 5 is a schematic, axial cross-sectional view of a bearing assembly 500 including a cage 502 (e.g., a bearing cage) that may be utilized in the bearing assemblies 100, 200 of FIGS. 2A and/or 2B. Accordingly, the cage 502 of FIG. 5 is a representation of the cage 102 of FIGS. 2A-2B. As shown in FIG. 5, the cage 502 includes a first slot 504, a second slot 506, and an axial segment 508 (e.g., a portion of the cage 502 that extends in an axial direction A defined by the bearing assembly 100, 200) between the first slot 504 and the second slot 506. A first roller bearing 510 (e.g., the roller bearing 110 of FIGS. 2A, 2B, and 3) is positioned in the first slot 504. A second roller bearing 512 is positioned in the second slot 506. The first roller bearing 510 is adjacent to the second roller bearing 512, and the first slot 504 is adjacent to the second slot 506. During operation, the first roller bearing 510 is a leading roller bearing that is followed by the second roller bearing (e.g., a trailing roller bearing).

The axial segment 508 of the cage 502 includes a conduit 514. A lengthwise span of the conduit 514 is positioned between the roller bearings 510, 512 (e.g., between the slots 504, 506) in a circumferential direction C defined by the bearing assembly 500. The conduit 514 includes an inlet 516 defined at an inner radial surface 518 of the cage 502. Further, the conduit 514 includes an outlet 520 defined at an outer radial surface 522 of the cage 502. Accordingly, the conduit 514 extends in a radial direction R defined by the bearing assembly 500. Furthermore, the inlet 516 and the outlet 520 are aligned in the same position in the circumferential direction C defined by the bearing assembly 500 (e.g., in the same geometric degree about the axial centerline of the bearing assembly 500 (e.g., the centerline axis 12 (FIG. 1)). Additionally, the inlet 516 and the outlet 520 are aligned in the same position in the axial direction A defined by the bearing assembly 500. In some examples, the inlet 516 and the outlet 520 are offset in the circumferential direction C and/or the axial direction A, as discussed in further detail below. Accordingly, the conduit 514 may be oblique relative to the circumferential direction C, the axial direction A, and/or the radial direction R. The bearing assembly 500 may include more than one of the conduit 514 in the axial segment 508 spaced apart in the axial direction A. The cage 502 may include a plurality of the conduit 514 positioned intermittently in the circumferential direction C in respective axial segments, such as the axial segment 508, between adjacent roller bearings, such as the roller bearings 510, 512.

Lubricant is positioned in a cavity 524 defined between the inner radial surface 518 of the cage 502, the roller bearings 510, 512, and an inner race of the bearing assembly 500 (e.g., the inner race 104 of FIGS. 2A-2B and 3). During operation, the lubricant in the cavity 524 encounters a centrifugal force from the cage 502, the roller bearings 510, 512, and the inner race. The centrifugal force causes the lubricant to enter the conduit 514 via the inlet 516 and, in turn, exit the conduit 514 via the outlet 520. Additional lubricant being injected into the cavity 524 may also cause the lubricant to enter the conduit 514. Accordingly, the conduit 514 prevents the lubricant from being trapped in the cavity 524 and generating heat via friction and/or churning, which leads to viscous heat. After exiting the conduit 514, the lubricant helps facilitate rotation of the roller bearings 510, 512 along an outer race (e.g., the outer race 204 of FIG. 2B) and/or exits the bearing assembly 500 between the cage 502 and the outer race and/or through the outer race (e.g., through the hole 208, the groove 210, and the slot 212 of FIG. 2B).

After exiting the bearing assembly 500, the lubricant passes through a lubricant treatment system, which cools the lubricant to maintain certain material properties before returning the lubricant to the bearing assembly 500. As discussed above, the conduit 514 reduces a temperature change (e.g., increase) that the lubricant encounters in the bearing assembly 500 during operation such that the size of components in, and/or a power consumption associated with, the lubricant treatment system can be reduced and/or material properties of the lubricant can be maintained for an extended period to enable the bearing assembly to operate with a reduced amount of the lubricant.

The conduit 514 and other conduits disclosed herein that carry lubricant include a cross-sectional diameter of approximately 30-50 mils. However, the conduit 514 and the other conduits disclosed herein that carry lubricant may have another cross-sectional diameter based on the desired flow rate of the lubricant and/or the amount of lubricant to be maintained in a cavity (e.g., the cavity 524) defined between a cage (e.g., the cage 502), an inner race (e.g., the inner race 104), and adjacent roller bearings (e.g., the roller bearings 510, 512). Further, the conduit 514 and the other conduits disclosed herein that carry lubricant may have a varied cross-sectional area that narrows from an inlet (e.g., the inlet 516) to an outlet (e.g., the outlet 520) to create a higher pressure at the inlet and a lower pressure at the outlet that pulls the lubricant through the conduits. Moreover, the conduit 514 and other conduits disclosed herein that carry lubricant may have a circular cross-sectional area, an elliptical cross-sectional area, or another shaped cross-sectional area to convey the lubricant between the associated inlet and outlet.

Figure 6:
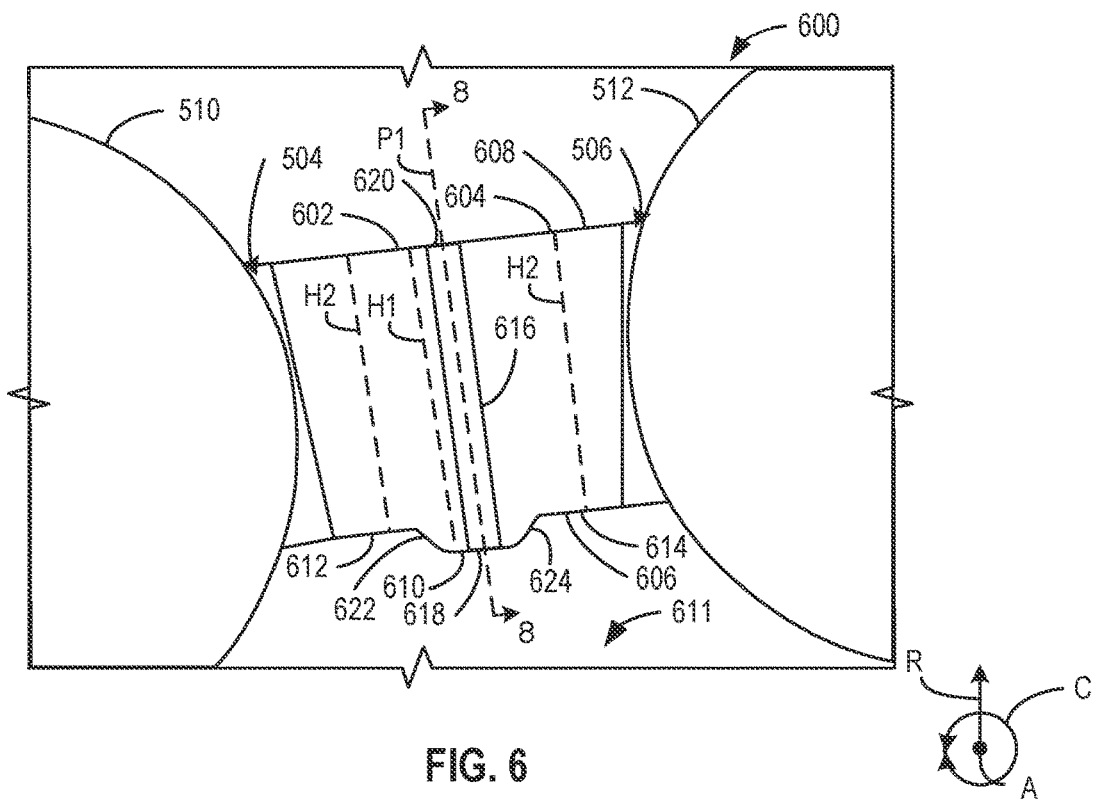
FIG. 6 is a schematic, axial cross-sectional view of another bearing assembly representative of the bearing assembly of FIG. 2A and/or the bearing assembly of FIG. 2B.

FIG. 6 is a schematic, axial cross-sectional view of another bearing assembly 600 including another cage 602 that may be utilized in the bearing assemblies 100, 200 of FIGS. 2A and/or 2B. Accordingly, the cage 602 of FIG. 6 is a representation of the cage 102 of FIGS. 2A-2B. As shown in FIG. 6, the cage 602 includes the first slot 504 in which the first roller bearing 510 is positioned and the second slot 506 in which the second roller bearing 512 is positioned. Further, the cage 602 includes an axial segment 604. The axial segment 604 includes an inner radial surface 606 and an outer radial surface 608. Further, the axial segment 604 includes a weir 610 (e.g., a protrusion, a projection, a protuberance, etc.) defined at the inner radial surface 606. A cavity 611 is defined between the roller bearings 510, 512, the inner radial surface 606 of the cage 602, and an inner race (e.g., the inner race 104 of FIGS. 2A-2B and 3).

The weir 610 extends inward in a radial direction R defined by the bearing assembly 600 (e.g., towards an axial centerline of the bearing assembly 600 (e.g., the centerline axis 12 (FIG. 1))). Accordingly, the weir 610 defines a first radial height H1 (e.g., a first radial depth) of the inner radial surface 606 of the cage 602 (e.g., a distance between the inner radial surface 606 and the outer radial surface 608). Further, the inner radial surface 606 includes a first portion 612 between the weir 610 and the first slot 504 and a second portion 614 between the weir 610 and the second slot 506 in the circumferential direction C defined by the bearing assembly 600. As such, the first portion 612 and the second portion 614 are on opposite sides of the weir 610 in the circumferential direction C. The first portion 612 and the second portion 614 define a second radial height H2 (e.g., a second radial depth) of the inner radial surface 606 of the cage 602 (e.g., a distance between the inner radial surface 606 and the outer radial surface 608) that is smaller than the first radial height H1. That is, the first radial height H1 extends closer than the second radial height H2 to a rotational axis of the cage 602 and/or the inner race (e.g., the inner race 104 of FIGS. 2A-2B and 3)). Accordingly, the weir 610 protrudes further into the cavity 611 than the first portion 612 and the second portion 614 of the inner radial surface 606. The weir 610 also includes a first inclined surface 622 that extends between a portion of the weir 610 that defines the first radial height H1 and the first portion 612 of the inner radial surface 606. Similarly, the weir 610 includes a second inclined surface 624 that extends between the portion of the weir 610 that defines the first radial height H1 and the second portion 614 of the inner radial surface 606. As such, the first inclined surface 622 and the second inclined surface 624 define a radial height increase from the second height H2 to the first height H1.

The cage 602 includes a conduit 616, similar to the conduit 514 (FIG. 5), that is in fluid connection with the cavity 611 via an inlet 618 defined in the weir 610 of the inner radial surface 606. The cage 602 also includes an outlet 620 of the conduit 616 in the outer radial surface 608. In FIG. 6, the conduit 616 extends in the radial direction R. Furthermore, the inlet 618 and the outlet 620 are aligned in the same position in the circumferential direction C defined by the bearing assembly 600 (e.g., in the same geometric degree about the axial centerline of the bearing assembly 600 (e.g., the centerline axis 12 (FIG. 1)). Additionally, the inlet 618 and the outlet 620 are aligned in the same position in the axial direction A defined by the bearing assembly 600. As such, a first axial-radial plane P1 defined by the conduit 616 intersects the axial centerline of the bearing assembly 600. In some examples, the inlet 618 and the outlet 620 are offset in the circumferential direction C and/or the axial direction A, as discussed in further detail below. Accordingly, the conduit 616 may be oblique relative to the circumferential direction C, the axial direction A, and/or the radial direction R. The bearing assembly 600 may include more than one of the conduit 616 spaced apart in the axial direction A.

During operation, the conduit 616 reduces shear forces (e.g., churning) encountered by the lubricant and, thus, reduces the viscous heat generation. Additionally, the weir 610 controls the amount of lubricant that remains in the cavity 611 to lubricate the roller bearings 510, 512 for rotation along the inner race (e.g., the inner race 104 of FIGS. 2A-2B). For example, the weir 610 increases the amount of lubricant that there is adjacent the first portion 612 and the second portion 614 (e.g., adjacent the roller bearings 510, 512, on opposite sides of the weir 610) before the lubricant enters the conduit 616 via the inlet 618. That is, the weir 610 creates two pockets of lubricant adjacent the first portion 612 and the second portion 614 that fill before the lubricant exits the cavity 611 such that a volume of the lubricant is maintained in the pockets for lubrication of the roller bearings 510, 512. Accordingly, the weir 610 enables the conduit 616 to drain the lubricant from the cavity 611 while also maintaining a certain amount of lubricant in the cavity 611 to lubricate the roller bearings 510, 512. Moreover, a height of the weir 610 is based on the volume of the lubricant that is to remain in the pockets for a particular bearing assembly. For example, the height of the weir 610 is based on a size and/or maximum rotational velocity of the roller bearings 510, 512, a shear strength of the cage 602, properties of the lubricant, and/or thermal characteristics in the particular bearing assembly. Similarly, the slope of the first inclined surface 622 and/or the second inclined surface 624 and/or a circumferential location of transition between the first and second portions 612, 614 and the inclined surfaces 622, 624 is defined based on the volume of the lubricant that is to remain the pockets, the size and/or maximum rotational velocity of the roller bearings 510, 512, the shear strength of the cage 602, the properties of the lubricant, and/or the thermal characteristics associated with the particular bearing assembly, as discussed further in association with FIG. 7. Therefore, although the weir 610 has a particular cross-sectional size, shape, and position in FIG. 6, it should be understood that the protrusion of the weir 610 into the cavity 611 may have a different size, shape, and/or position to control the amount of lubricant that remains in the cavity 611 during operation.

Figure 7:
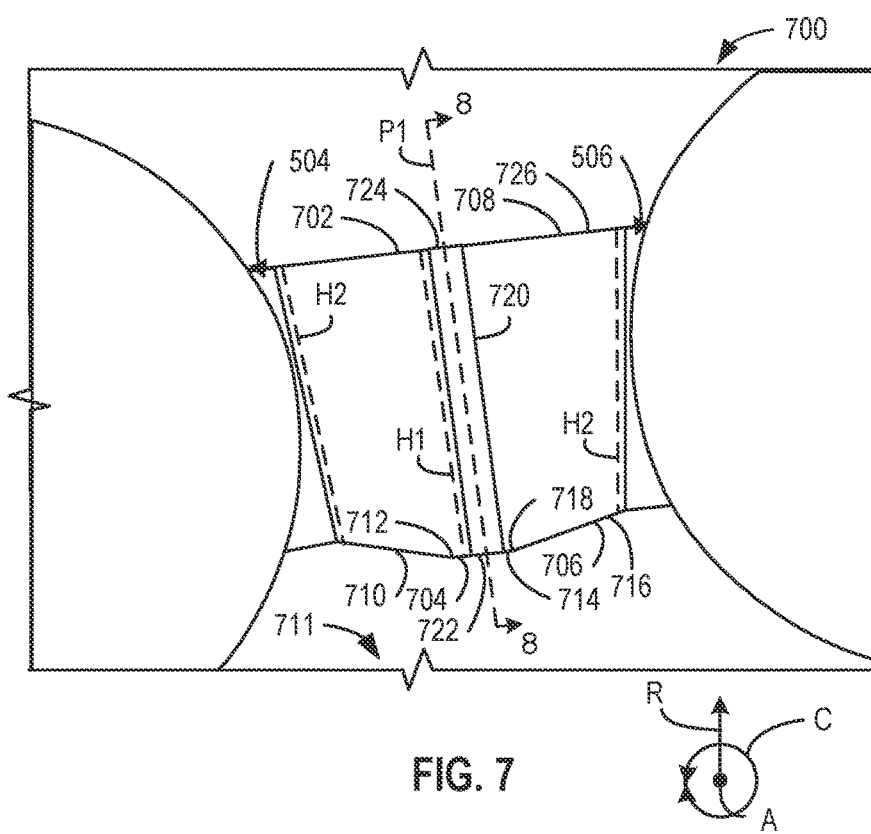
FIG. 7 is a schematic, axial cross-sectional view of another bearing assembly representative of the bearing assembly of FIG. 2A and/or the bearing assembly of FIG. 2B.

FIG. 7 is a schematic, axial cross-sectional view of another bearing assembly 700 including another bearing cage 702 that may be utilized in the bearing assemblies 100, 200 of FIGS. 2A and/or 2B. Accordingly, the cage 702 of FIG. 7 is a representation of the cage 102 of FIGS. 2A-2B. The cage 702 of FIG. 7 includes another weir 704 defined in an inner radial surface 706 of an axial segment 708 of the cage 702. Specifically, the inner radial surface 706 defines a gradual change from the first radial height H1 of the weir 704 and the second radial height H2 of the inner radial surface 706 defined proximate the slots 504, 506. That is, the cage 702 includes an approximately constant slope along the inner radial surface 706 between the first radial height H1 and the slots 504, 506. In particular, the weir 704 includes a first inclined surface 710 that extends from the first slot 504 to a first circumferential edge 712 of a level portion 714 of the weir 704. Similarly, the weir 704 includes a second inclined surface 716 that extends from the second slot 506 to a second circumferential edge 718 of the level portion 714. The approximately constant slope between the respective slots 504, 506 and the respective edges 712, 718 of the level portion 714 reduces a drag force encountered by the weir 704 during a rotation of the cage 702.

The cage 702 includes a conduit 720 that extends from the inner radial surface 706 to an outer radial surface 726, similar to the conduit 616 of FIG. 6. Accordingly, the bearing assembly 700 may include more than one of the conduit 720 in the axial segment 708 spaced apart in the axial direction A. Lubricant in a cavity 711 defined between the cage 702, an inner race (e.g., the inner race 104 of FIGS. 2A-2B and/or 3), and the adjacent roller bearings 510, 512 enters the conduit 720 via an inlet 722 defined in the level portion 714 of the weir 704. Further, the lubricant exits the conduit 720 via an outlet 724 defined in the outer radial surface 726 of the axial segment 708. Similar to the conduit 616 of FIG. 6, a mid-portion of the conduit 720 is defined by the first axial-radial plane P1, which intersects the axial centerline of the bearing assembly (e.g., the centerline axis 12 (FIG. 1). Alternatively, the inlet 722 and the outlet 724 may be offset in the circumferential direction C and/or the axial direction A, as discussed in further detail below.

Although the level portion 714 of the weir 704 in FIG. 7 has a larger width than the conduit 720 in the circumferential direction C, it should be understood that the level portion 714 may have approximately the same width in the circumferential direction C as the conduit 720. Alternatively, the weir 704 may not include the level portion 714 and may be defined by the first and second inclined surfaces 710, 716, which either extend to the inlet 722 of the conduit 720 or meet at a shared edge aligned with the conduit in the circumferential direction C. In such examples, the shared edge may have a third height (not shown) that is greater than the first height and extends radially inward of the inlet 722 defined in the inner radial surface 706.

Figure 8:
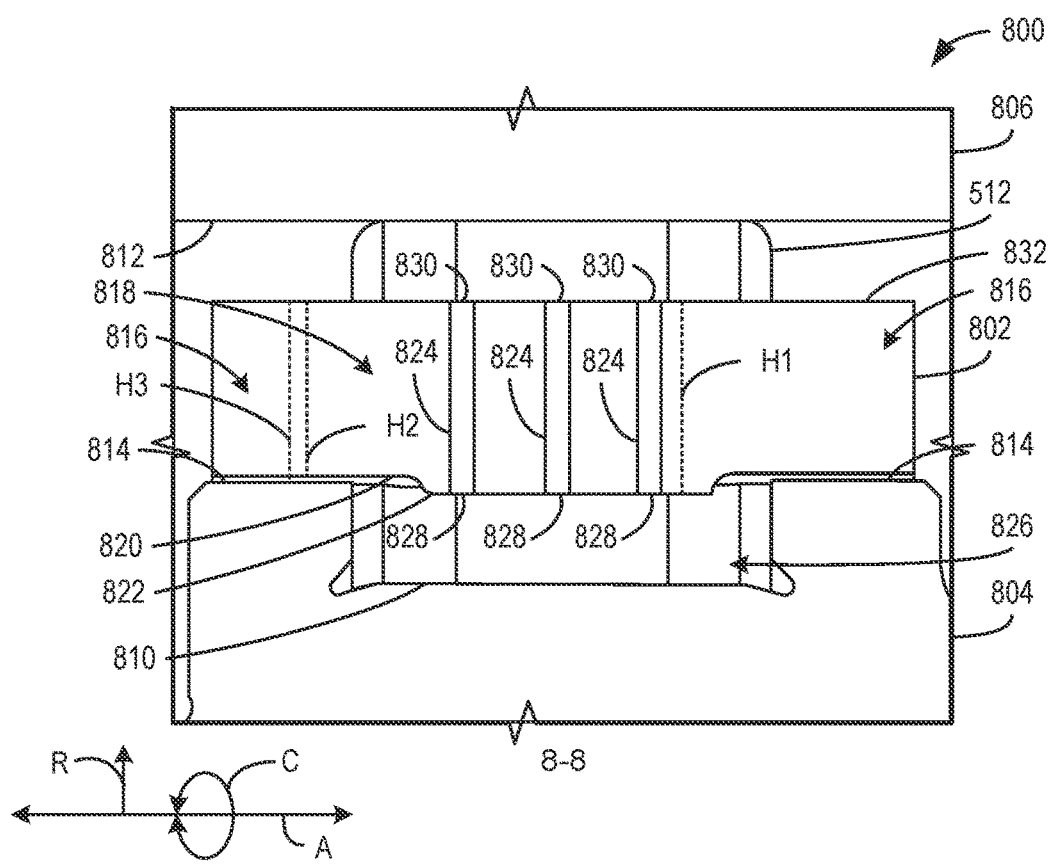
FIG. 8 is a schematic, circumferential cross-sectional view of the bearing assembly of FIGS. 6 and/or 7 taken along the section line 8-8 in FIGS. 6 and/or 7.

FIG. 8 illustrates a partial cross-sectional view of a bearing assembly 800 taken through the 8-8 section line (e.g., through the first axial-radial plane P1) of FIGS. 6 and/or 7. Accordingly, the bearing assembly 800 includes a cage 802, which corresponds to the cage 602 of FIG. 6 or the cage 702 of FIG. 7. Moreover, the cage 802 is a representation of the cage 102 of FIGS. 2A-2B.

As shown in FIG. 8, the bearing assembly 800 also includes an inner race 804 (e.g., the inner race 104 of FIGS. 2A-2B) and an outer race 806 (e.g., the outer race 112 of FIG. 2A, the outer race 204 of FIG. 2B). The roller bearing 512 is in contact with, and rolls along, an outer radial surface 810 of the inner race 804 (e.g., a first roller bearing riding surface, an inner raceway track, etc.) and an inner radial surface 812 of the outer race 806 (e.g., a second roller bearing riding surface, an outer raceway track, etc.) during operation. Furthermore, the inner race 804 includes cage landings 814 (e.g., shoulders, berms, axial walls, etc.) on opposite axial sides of the roller bearing 512.

The cage 802 is an inner race-guided cage such that circumferential segments 816 of the cage 802 are supported by the cage landings 814. The circumferential segments 816 of the cage 802 are positioned on opposite axial sides of the roller bearing 512 and span along the circumferential direction C defined by the bearing assembly 800. The cage 802 also includes an axial segment 818 between the circumferential segments 816 in the axial direction A. Accordingly, the axial segment 818 is aligned with the roller bearing 512 in the axial direction A. Moreover, the cage 802 includes a plurality of the axial segment 818 positioned intermittently in the circumferential direction C between adjacent roller bearings.

An inner radial surface 820 of the axial segment 818 includes a weir 822 that extends between the cage landings 814 in the radial direction R. As shown in FIG. 8, the weir 822 includes the first radial height H1, and the circumferential segments 816 of the cage 802 include the second radial height H2. Moreover, the cage landings 814 are separated from the outer radial surface 810 of the cage 802 by a third distance H3 (e.g., a third radial depth), which is less than the first radial height H1 and greater than the second radial height H2. Although FIG. 8 shows a portion of the inner radial surface 820 of the axial segment 818 as approximately flat in the axial direction A on opposite axial sides of the weir 822 (e.g., between the weir 822 and the cage landings 814), it should be understood that the weir 822 may extend approximately to the cage landings 814 in the axial direction A.

The cage 802 also includes conduits 824 (e.g., the conduit 616 of FIG. 6, the conduit 720 of FIG. 7) to transport lubricant out of a cavity 826 defined between the roller bearing 512, an adjacent roller bearing (e.g., the roller bearing 510 of FIGS. 5-7), the inner race 804, and the cage 802. Specifically, the lubricant enters the conduits 824 via inlets 828 defined on the weir 822 and exits the conduits 824 via outlets 830 defined on an outer radial surface 832 of the cage 802. After exiting the conduits 824, the lubricant may provide lubrication between the roller bearing 512 and the outer race 806 and/or exit the bearing assembly 800 and enter a sump (e.g., the sump 124 of FIGS. 2A and/or 2B) in fluid connection with a system that recirculates the lubricant to the bearing assembly 800.

In some examples, portions of the weir 822 between the inlets 828 of the conduits 824 in the axial direction A extend closer to the outer radial surface 810 of the inner race 804 than the inlets 828 of the conduits 824 to help the lubricant that is inside the cavity 826 remain adjacent to the roller bearing 512 or another roller bearing on an opposite side of the cavity 826 (e.g., the roller bearing 510). The conduits 824 include a cross-sectional diameter of approximately 30-50 mils. However, the conduits 824 may have another cross-sectional diameter based on the desired flow rate of the lubricant and/or the amount of lubricant to be maintained in the cavity 826. Further, the conduits 824 may have a varied cross-sectional area that narrows from the inlets 828 to the outlets 830 to create a higher pressure at the inlets 828 and a lower pressure at the outlets 830 that pulls the lubricant through the conduits 824. Although three conduits 824 are shown in FIG. 8, it should be understood that the cage 802 may include one or more of the conduits 824.

Figure 9:
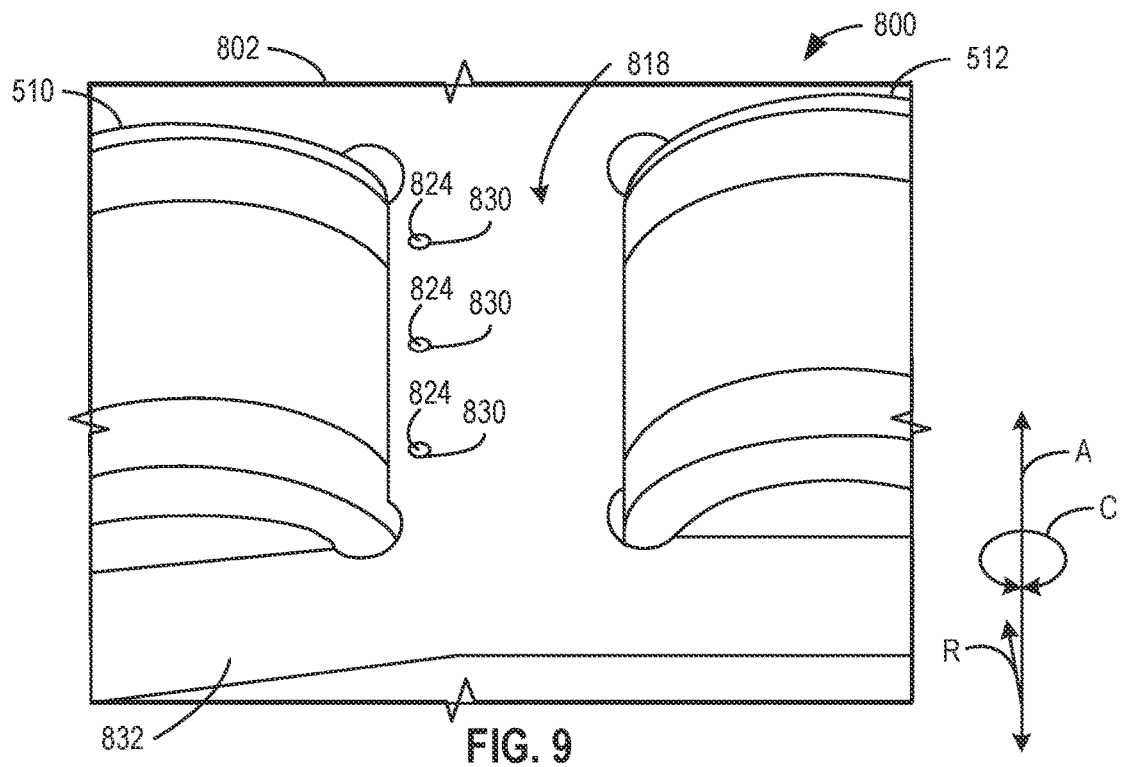
FIG. 9 is a partial perspective view of the bearing assembly of FIG. 8.

FIG. 9 is a partial perspective view of the bearing assembly 800 of FIG. 8. As shown in FIG. 9, the outlets 830 are defined in the outer radial surface 832 of the axial segment 818 of the cage 802. As such, lengthwise spans of the conduits 824 are positioned between the adjacent roller bearings 510, 512 in the circumferential direction C defined by the bearing assembly 800. Although the outlets 830 of FIG. 9 have a circular cross-sectional shape, the outlets 830 and, more generally, the conduits 824 may have any other cross-sectional shape, such as an elliptical cross-sectional shape, to help transport the lubricant out of the cavity 826 at a desired rate.

Figure 10:
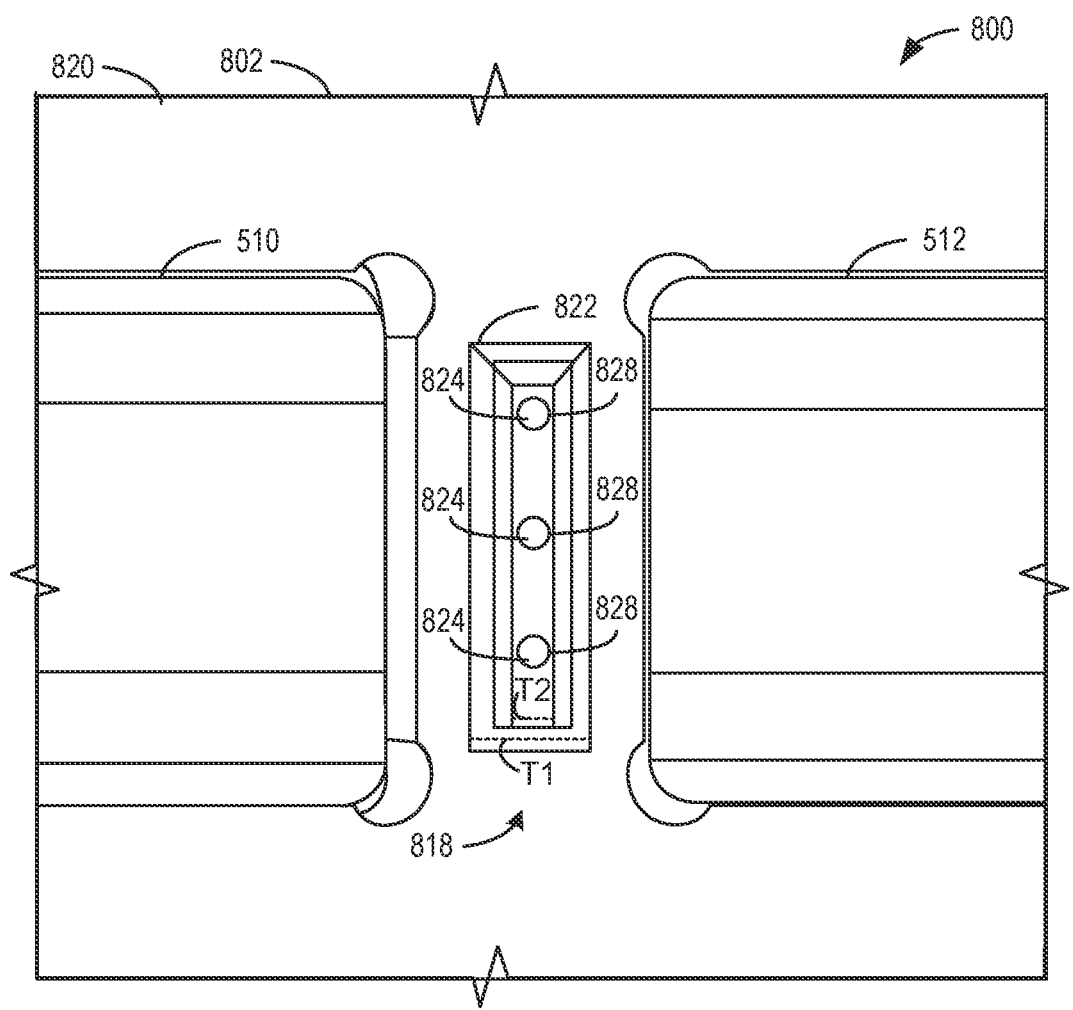
FIG. 10 is another view of the bearing assembly of FIG. 8.

FIG. 10 is another view (e.g., a radially outward view) of the inner radial surface 820 of the bearing assembly 800 of FIG. 8. As shown in FIG. 10, the inlets 828 of the conduits 824 are defined in the weir 822 of the inner radial surface 820. The weir 822 may be tapered from a first thickness T1 to a second thickness T2 where the inlets 828 are defined.

The weir 822 may be integral part of the cage 802 (e.g., formed integrally with the rest of the cage 802). Alternatively, the weir 822 may be a separate part that is inserted into a slot defined in the axial segment 818 of the cage 802 and coupled to the cage 802. For example, when the weir 822 is defined by a separate, insertable part initially, the slot for the insertable part can be drilled or cut into the axial segment 818 of the cage 802 via laser drilling. Further, an outer radial portion of the insertable part can be inserted through the slot at the inner radial surface 820 of the cage 802 and pushed through to be flush with the outer radial surface 832 (FIGS. 8-9). Furthermore, the weir 822 can be defined by an inner radial portion of the insertable part that extends past an inner radial end of the slot when the outer radial portion of the insertable part is flush with the outer radial surface 832. As such, the inner radial portion of the insertable part is positioned between the roller bearings 510, 512 in the circumferential direction C. The first thickness T1 may exceed a size of the slot through which the outer radial portion of the insertable part is inserted to prevent the insertable part from extending through the slot further than desired or specified. When the portion of the inserted part defining the first thickness T1 contacts the inner radial surface 820 of the axial segment 818, the inserted part can be coupled to the cage 802, such as via a press fit, welding, or another coupling operation. The second thickness T2 may correspond with the size of the slot such that the conduits 824 in the insertable part extend through the slot from the inner radial surface 820 to the outer radial surface 832 (FIG. 8). As such, the height of the weir 822 (e.g., the first height H1 (FIG. 8)) can be defined by the height of the insertable part between the first thickness T1 and the second thickness T2. Accordingly, different insertable parts may have different sizes to enable different lubricant draining and/or cage drains to be provided by the weir 822. Thus, an insertable part having a certain size may be selected based on characteristics of the operation of the bearing assembly 800.

Figure 11:
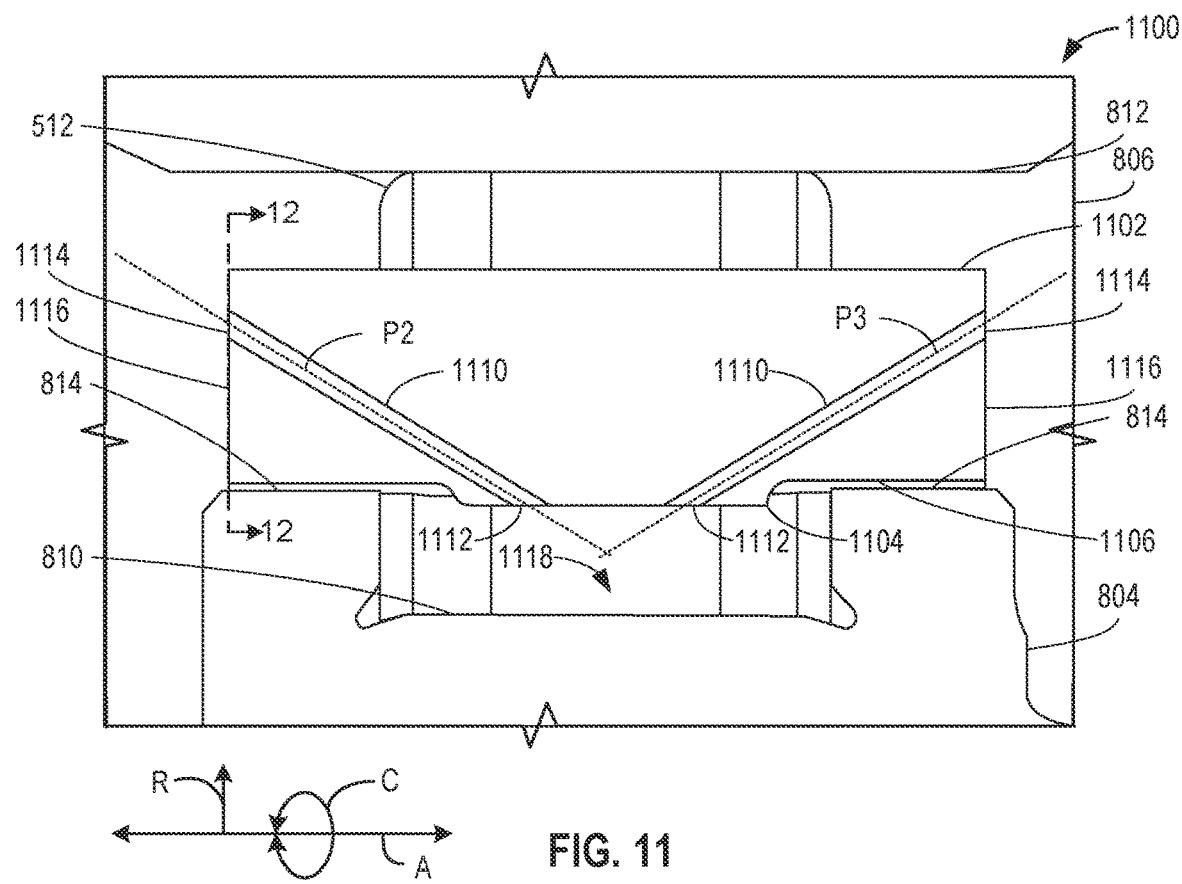
FIG. 11 is a schematic, circumferential cross-sectional view of another bearing assembly representative of the bearing assembly of FIG. 2A and/or the bearing assembly of FIG. 2B.

FIG. 11 illustrates a partial cross-sectional view of another bearing assembly 1100 including another cage 1102 that may be utilized in the bearing assembly 100 of FIG. 2A and/or the bearing assembly 200 of FIG. 2B. Accordingly, the cage 1102 is a representation of the cage 102 of FIGS. 2A-2B. The bearing assembly 1100 includes the inner race 804, the outer race 806, the roller bearing 512 positioned between the inner race 804 and the outer race 806, and the cage 1102 positioned around the roller bearing 512 between the inner race 804 and the outer race 806. As discussed, during operation, the roller bearing 512 is in contact with, and rolls along, the outer radial surface 810 of the inner race 804 and the inner radial surface 812 of the outer race 806. The inner race 804 also includes the cage landings 814. The roller bearing 512 is positioned between the cage landings 814 in the axial direction A.

The cage 1102 includes another weir 1104 protruding from an in an inner radial surface 1106 of an axial segment 1108 of the cage 1102. The cage 1102 also includes conduits 1110 extending between inlets 1112 defined in the weir 1104 and outlets 1114 defined in outer axial surfaces 1116 of the cage 1102 (e.g., surfaces facing an environment external to the bearing assembly 1100 (e.g., the sump 124 (FIGS. 2A-2B)) in the axial direction A). Accordingly, the inlets 1112 are offset from the outlets 1114 in the axial direction A defined by the bearing assembly 1100. That is, the conduits 1110 are angled in the first axial-radial plane P1 (FIGS. 6-7) and respective lengthwise spans of the conduits 1110 define a second axial-radial plane P2 and a third axial-radial plane P3, respectively. As shown in FIG. 11, the second axial-radial plane P2 and the third axial-radial plane P3 intersect in a cavity 1118 defined between the roller bearing 512, an adjacent roller bearing (e.g., the roller bearing 510 (FIG. 5)), the inner race 804, and the cage 1102. As such, the conduits 1110 are oblique relative to the axial direction A and the radial direction R defined by the bearing assembly 1100. During operation, lubricant in the cavity 1118 flows through the conduits 1110 and exits the bearing assembly 1100. In turn, the lubricant can enter a sump (e.g., the sump 124 (FIGS. 2A and 2B)) in fluid connection with a system that recirculates the lubricant to the bearing assembly 1100.

Figure 12:
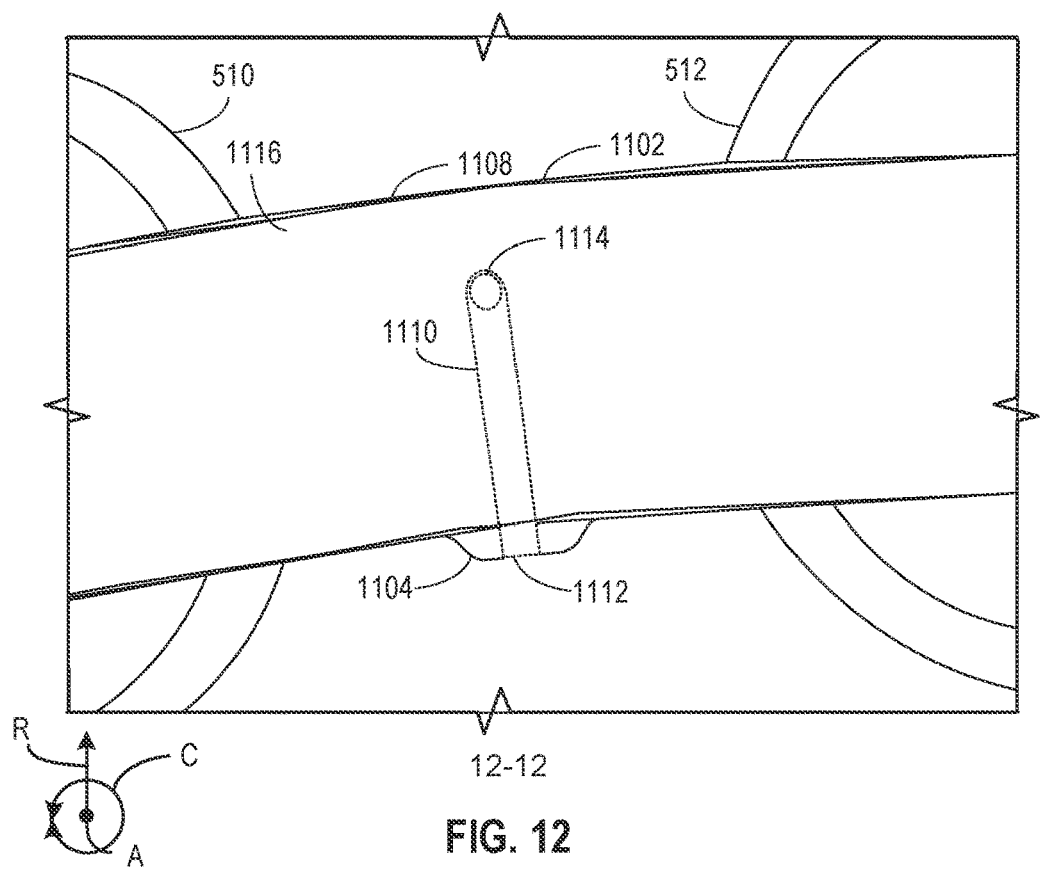
FIG. 12 is a schematic, axial cross-sectional view of the bearing assembly of FIG. 11, taken along the section line 12-12 of FIG. 11.

FIG. 12 illustrates a partial cross-sectional view of the bearing assembly 1100 of FIG. 11 taken through the 12-12 section line of FIG. 11 with the inner race 804 and the outer race 806 removed. Although the conduits 1110 would not be visible from the viewpoint through the 12-12 section line of FIG. 11, a perimeter of the conduits 1110 is shown by a dashed line for purposes of explanation. As shown in FIG. 12, the outlets 1114 of the conduits 1110 are defined in the outer axial surfaces 1116 of the cage 1102. As a result, the lubricant that flows through the conduits 1110 exits the bearing assembly 1100. As also shown in FIG. 12, the inlets 1112 and the outlets 1114 are aligned in the same position in the circumferential direction C defined by the bearing assembly 1100 (e.g., in the same geometric degree about the axial centerline of the bearing assembly 1100 (e.g., the centerline axis 12 (FIG. 1)). Alternatively, the conduit 1110 may be oblique relative to the circumferential direction C such that the outlet 1114 trails the inlet 1112 in a direction of rotation of the cage 1102.

Figure 13:
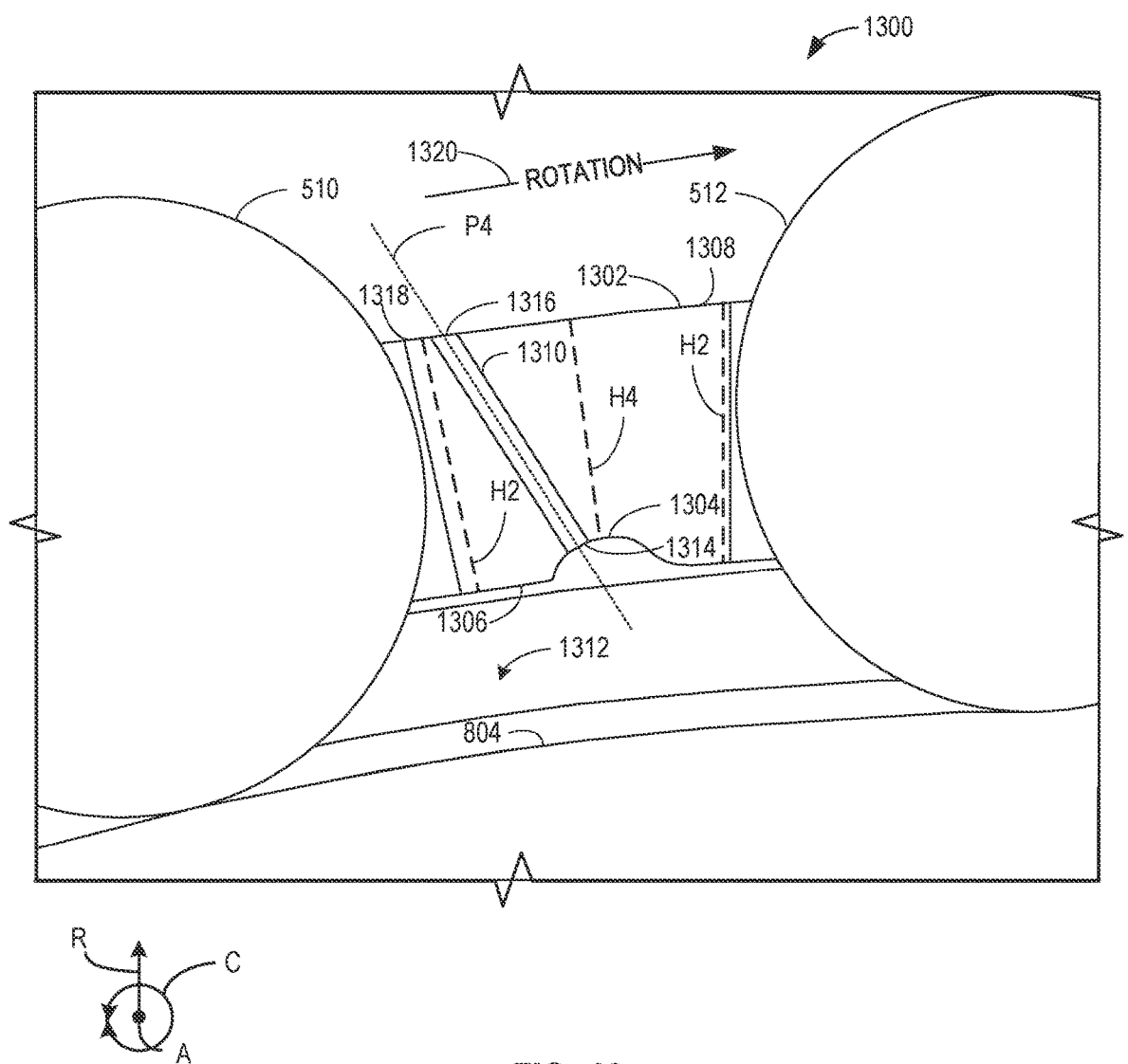
FIG. 13 is a schematic, axial cross-sectional view of another bearing assembly representative of the bearing assembly of FIG. 2A and/or the bearing assembly of FIG. 2B.

FIG. 13 is a schematic, axial cross-sectional view of another bearing assembly 1300 including another bearing cage 1302 that may be utilized in the bearing assemblies 100, 200 of FIGS. 2A and/or 2B. Accordingly, the cage 1302 of FIG. 13 is a representation of the cage 102 of FIGS. 2A-2B. As shown in FIG. 13, the cage 1302 includes an indentation 1304 (e.g., a scoop, a notch, a groove, etc.) in an inner radial surface 1306 of an axial segment 1308 of the cage 1302. In FIG. 13, the indentation 1304 includes curvature. Alternatively, the indentation 1304 may be defined by another cut-out geometry (e.g., a triangular cut-out, a trapezoidal cut-out, a rectangular cut-out, etc.).

The cage 1302 also includes a conduit 1310 in the axial segment 1308. The conduit 1310 is fluidly coupled to a cavity 1312 defined between the roller bearings 510, 512, the inner race 804, and the cage 1302 via an inlet 1314. In particular, the inlet 1314 is defined in the indentation 1304 at the inner radial surface 1306 of the cage 1302. An outlet 1316 of the conduit 1310 is defined in an outer radial surface 1318 of the axial segment 1308. The bearing assembly 1300 may include more than one of the conduit 1310 spaced apart in the axial direction A.

In FIG. 13, the outlet 1316 is offset from the inlet 1314 in the circumferential direction C. In particular, the outlet 1316 trails the inlet 1314 in a direction of rotation 1320 of the cage 1302 and the inner race 804. As such, a fourth axial-radial plane P4 defined by a lengthwise span of the conduit 1310 does not intersect the axial centerline of the bearing assembly 1300 (e.g., the centerline axis 12 (FIG. 1). Alternatively, the outlet 1316 and the inlet 1314 may be aligned in the circumferential direction C and occupy an axial-radial plane that intersects the axial centerline of the bearing assembly 1300, as discussed further in association with FIG. 14.

The indentation 1304 has a fourth height H4 (e.g., a fourth radial depth, a distance between the outer radial surface 1318 and the indentation 1304). Portions of the inner radial surface 1306 on opposite sides of the indentation 1304 in the circumferential direction C have the second height H2, which is greater than the fourth height H4. That is, the second height H2 extends closer than the fourth height H4 to a rotational axis of the cage 1302 and/or the inner race 804. During operation, lubricant in the cavity 1312 encounters a centrifugal force from the rotation of the inner race 804 and/or the cage 1302. Additionally, the lubricant may encounter a tangential force from the first roller bearing 510 and/or the second roller bearing 512. In particular, the lubricant in the cavity 1312 of FIG. 13 encounters a tangential force from the first roller bearing 510 that drives the lubricant towards the inner radial surface 1306 of the cage 1302 as the roller bearings 510, 512 rotate counter-clockwise. Similarly, lubricant in a cavity on an opposite side of the second roller bearing 512 may encounter a tangential force from the second roller bearing 512. As the centrifugal and/or tangential forces drive the lubricant in the cavity 1312 radially outwards, the lubricant fills the indentation 1304 and enters the conduit 1310 via the inlet 1314. The indentation 1304 provides an increased area for collection and draining of the lubricant. As such, the indentation 1304 enables the lubricant to drain out of the cavity 1312 at a faster rate. A portion of the indentation 1304 around the inlet 1314 may have an increased depth in the cage 1302 (e.g., extend further radially outwards) than other areas of the indentation 1304 to help guide the lubricant that is in the indentation 1304 towards the inlet 1314.

The lubricant exits the conduit 1310 via the outlet 1316 at the outer radial surface 1318 of the cage 1302. During operation, the circumferentially offset position of the outlet 1316 relative to the inlet 1314 enables the rotational inertia of the lubricant to help move the lubricant through the conduit 1310 in addition to the centrifugal force from the rotation of the cage 1302. After exiting the conduit 1310, the lubricant can provide lubrication between the roller bearing 510 and the outer race 806 (not shown) and/or exit the bearing assembly 1300 between the cage 1302 and the outer race 806 and/or through the outer race 806 (e.g., the outer race 204 of FIG. 2B).

Figure 14:
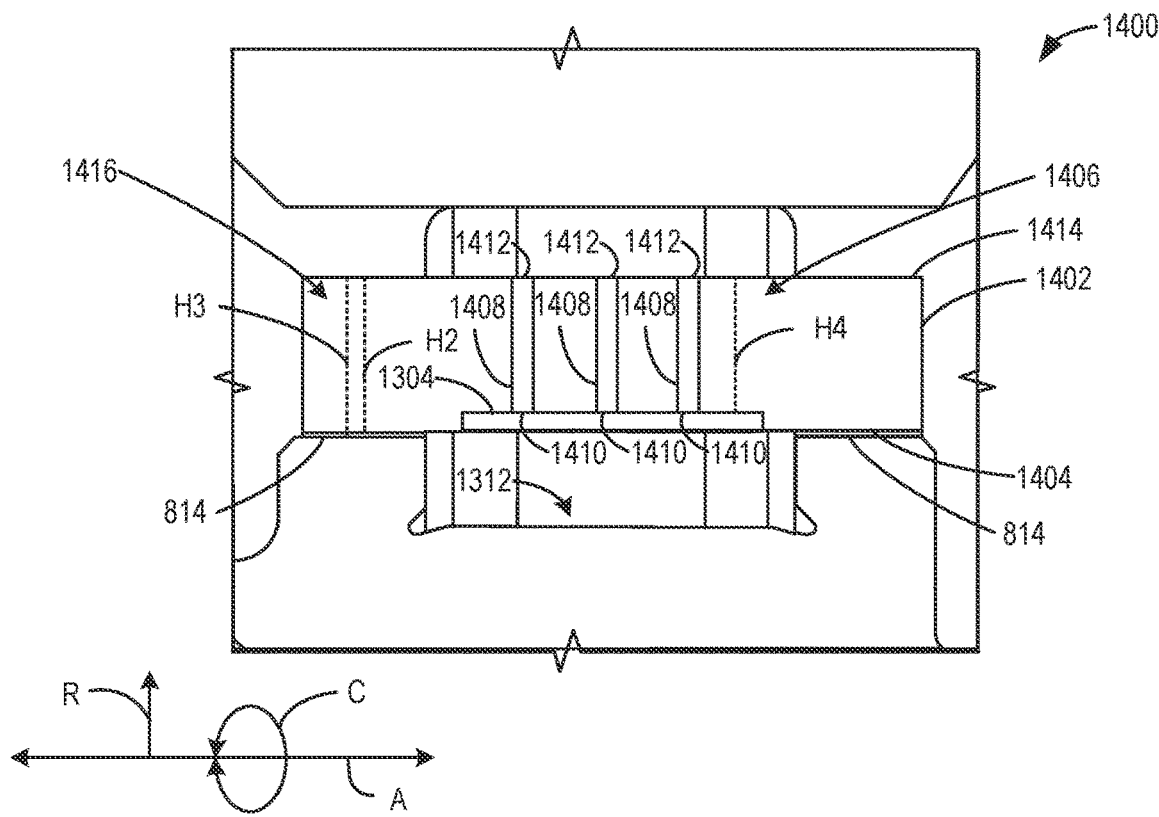
FIG. 14 is a schematic, circumferential cross-sectional view of another bearing assembly representative of the bearing assembly of FIG. 2A and/or the bearing assembly of FIG. 2B.

FIG. 14 is a schematic, circumferential cross-sectional view of another bearing assembly 1400 including another bearing cage 1402 that may be utilized in the bearing assemblies 100, 200 of FIGS. 2A and/or 2B. Accordingly, the cage 1402 of FIG. 14 is a representation of the cage 102 of FIGS. 2A-2B. As shown in FIG. 14, the cage 1402 includes the indentation 1304 in an inner radial surface 1404 of an axial segment 1406 of the cage 1402. The cage 1402 also includes conduits 1408 in the axial segment 1406 that are fluidly coupled to the cavity 1312 via inlets 1410. Outlets 1412 of the conduits 1408 are defined in an outer radial surface 1414 of the axial segment 1406.

In FIG. 14, the outlets 1412 and the inlets 1410 of the respective conduits 1408 are aligned (e.g., in a same position) in the circumferential direction C defined by the bearing assembly 1400. Additionally, the outlets 1412 and the inlets 1410 of the respective conduits 1408 are aligned in the axial direction A. As such, the first axial-radial plane P1 (FIGS. 6-7) defined by the conduits 1408 intersects an axial centerline of the bearing assembly 1400 (e.g., the centerline axis 12 (FIG. 1)). At least a portion of the indentation 1304 has the fourth radial height H4 between the inner radial surface 1404 and the outer radial surface, and circumferential segments 1416 of the cage 1402 have the second radial height H2. Moreover, the cage landings 814 are separated from the outer radial surface 1414 of the cage 1402 by the third radial distance H3, which is greater than the fourth radial height H4 and the second radial height H2.

The bearing assembly 1400 of FIG. 14 operates similar to the bearing assembly 1300 of FIG. 13. However, the conduits 1408 are not offset in the circumferential direction C like the conduit 1310 of FIG. 13. Advantageously, the indentation 1304 helps guide the lubricant in the cavity 1312 into the conduits 1408. Further, portions of the indentation 1304 positioned around the inlets 1410 may have an increased depth into the cage 1402 (e.g., extend further radially outwards than other areas of the indentation 1304) such that the centrifugal force continually moves the lubricant in the indentation 1304 towards the inlets 1410.

Figure 15:
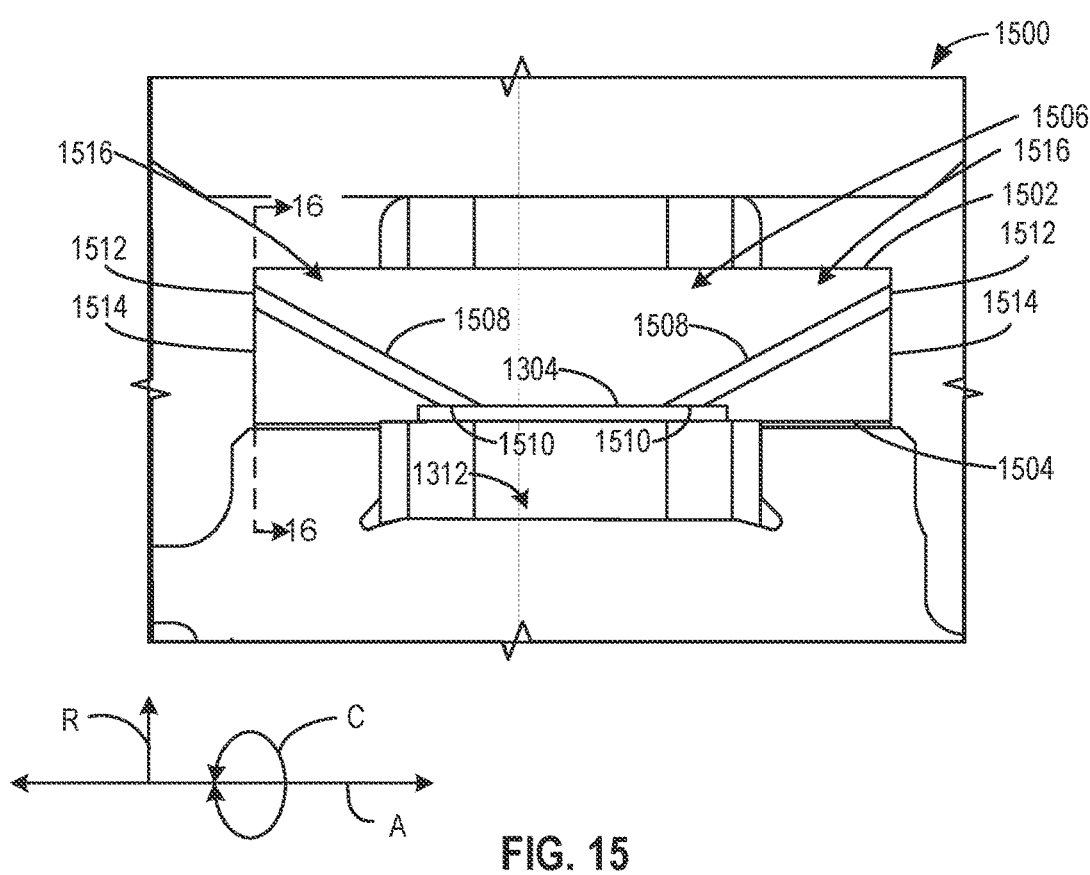
FIG. 15 is a schematic, circumferential cross-sectional view of another bearing assembly representative of the bearing assembly of FIG. 2A and/or the bearing assembly of FIG. 2B.

FIG. 15 is a schematic, circumferential cross-sectional view of another bearing assembly 1500 including another bearing cage 1502 that may be utilized in the bearing assemblies 100, 200 of FIGS. 2A and/or 2B. Accordingly, the cage 1502 of FIG. 15 is a representation of the cage 102 of FIGS. 2A-2B. As shown in FIG. 15, the cage 1502 includes the indentation 1304 in an inner radial surface 1504 of an axial segment 1506. The cage 1502 also includes conduits 1508 in the axial segment 1506. The conduits 1508 are fluidly coupled to the cavity 1312 via inlets 1510. Outlets 1512 of the conduits 1508 are defined in outer axial surfaces 1514 of the cage 1502. Accordingly, the conduits 1508 extend from the axial segment 1506 through circumferential segments 1516 to the outer axial surfaces 1514. As such, the outlets 1512 and the inlets 1510 of the conduits 1508 are offset (e.g., not aligned, in a different position) in an axial direction A defined by the bearing assembly 1500. As such, the conduits 1508 are oblique relative to the axial direction A. The outlets 1512 and the inlets 1510 are aligned in a same position in the circumferential direction C defined by the bearing assembly 1500. Alternatively, the outlets 1512 may also be offset from the inlets 1510 in the circumferential direction C similar to the conduit 1310 in the bearing assembly 1300 of FIG. 13, as discussed further in association with FIG. 17.

The indentation 1304 collects lubricant in the cavity 1312 that moves radially outward as a result of centrifugal and tangential forces encountered during operation of the bearing assembly 1500. As discussed, the indentation 1304 helps guide the lubricant into the conduits 1508. Further, the lubricant exits the conduits 1508 via the outlets 1512. Thus, the lubricant is directed out of the bearing assembly 1500 via the conduits 1508. In turn, the lubricant can be discarded and/or flow through a thermal treatment and recirculation system (not shown) that returns the lubricant to the bearing assembly 1500. As a result, the bearing cage 1502 minimizes or otherwise reduces viscous and frictional heat generation from the lubricant by preventing the lubricant from building up in the cavity 1312.

Figure 16:
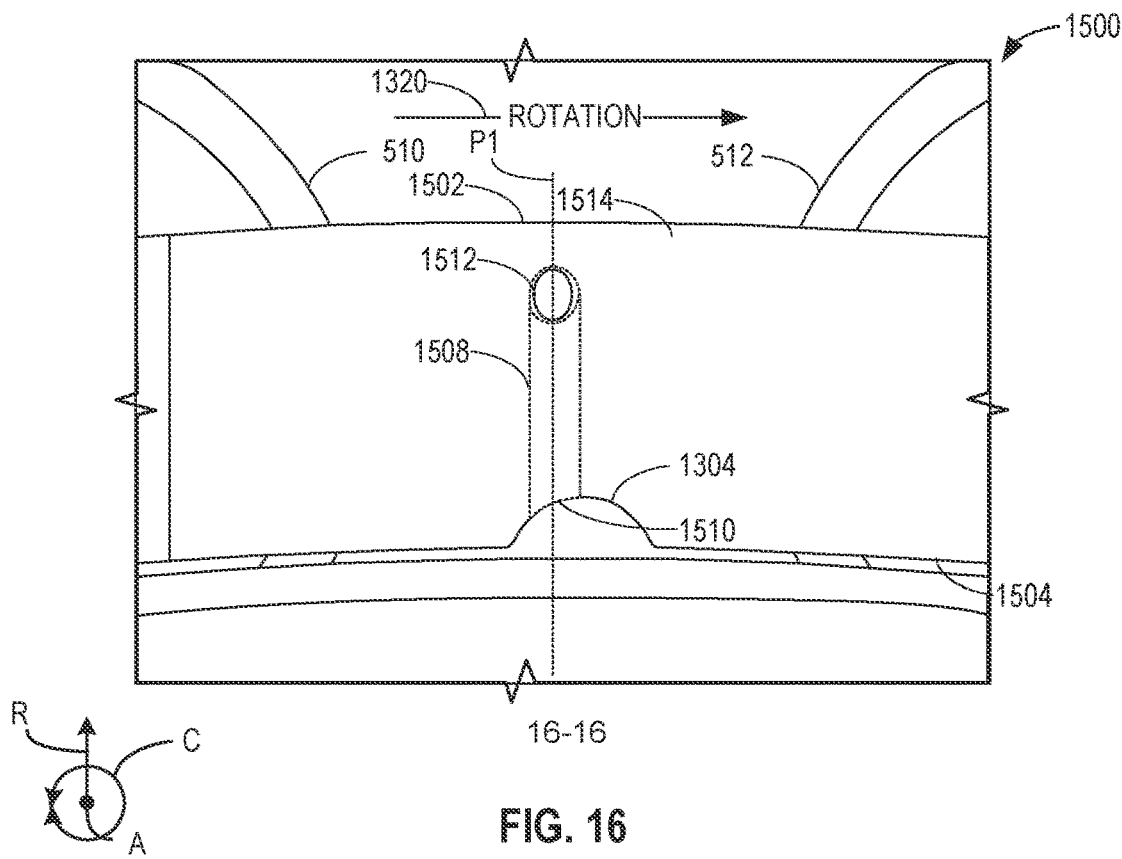
FIG. 16 is a schematic, axial cross-sectional view of a configuration of a bearing cage of the bearing assembly of FIG. 15, taken along the section line 16-16 of FIG. 15.

FIG. 16 illustrates a partial cross-sectional view of the bearing assembly 1500 of FIG. 15 taken through the 16-16 section line of FIG. 15. Although the conduits 1508 would not be visible from the viewpoint through the 16-16 section line of FIG. 15, a perimeter of the conduits 1110 is shown by a dashed line for purposes of explanation. As shown in FIG. 16, the outlets 1512 of the conduits 1508 are defined in the outer axial surfaces 1514 of the cage 1502. As a result, the lubricant that flows through the conduits 1508 is discarded from the bearing assembly 1500. As also shown in FIG. 16, the inlets 1510 and the outlets 1512 of the conduits 1508 are aligned in the same position in the circumferential direction C defined by the bearing assembly 1500. As such, the conduits 1508 are positioned in the first axial-radial plane P1, which intersects the axial centerline of the bearing assembly 1500 (e.g., the centerline axis 12 (FIG. 1)).

In FIG. 16, a center portion of the cross-sectional area of the inlets 1510 trails a peak depth of the indentation 1304 in the inner radial surface 1504 in the direction of rotation 1320. As a result, the cross-sectional areas of the inlets 1510 are positioned in a trailing portion of the indentation 1304 such that the rotational inertia of the lubricant causes the lubricant to move towards the inlets 1510 at a faster rate. As also shown in FIG. 16, a lengthwise span of the conduits 1508 is positioned between the roller bearings 510, 512 in the circumferential direction C.

Figure 17:
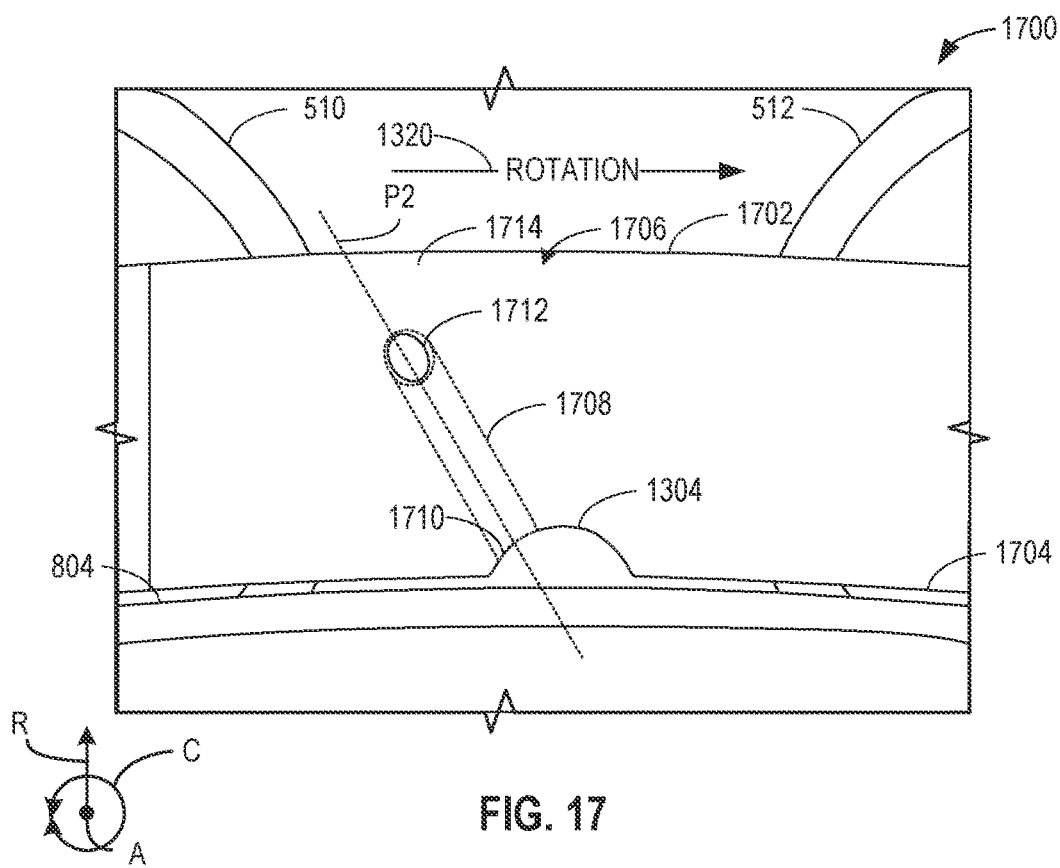
FIG. 17 is a schematic, axial cross-sectional view of another configuration of a bearing cage of the bearing assembly of FIG. 15.

FIG. 17 is a schematic, axial cross-sectional view of another bearing assembly 1700 including another bearing cage 1702. The cage 1702 of FIG. 17 is another example implementation of the cage 102 of FIGS. 2A-2B. As shown in FIG. 17, the cage 1702 includes the indentation 1304 in an inner radial surface 1704 of an axial segment 1706. As also shown in FIG. 17, the cage 1702 includes a conduit 1708. An inlet 1710 of the conduit 1708 is defined in the indentation 1304, and an outlet 1712 of the conduit 1708 is defined in an outer axial surface 1714 of the cage 1702.

In FIG. 17, the outlet 1712 is offset from the inlet 1710 in the circumferential direction C defined by the bearing assembly 1700. In particular, the outlet 1712 trails the inlet 1710 in the direction of rotation 1320 of the cage 1702 and the inner race 804. As such, the lengthwise span of the conduit 1708 is positioned in the second axial-radial plane P2, which does not intersect the axial centerline of the bearing assembly 1700 (e.g., the centerline axis 12 (FIG. 1)). During operation, the circumferentially offset position of the outlet 1712 relative to the inlet 1710 enables a rotational inertia of the lubricant to help move the lubricant through the conduit 1708 in addition to the centrifugal force from the rotation of the cage 1702.

Figure 18:
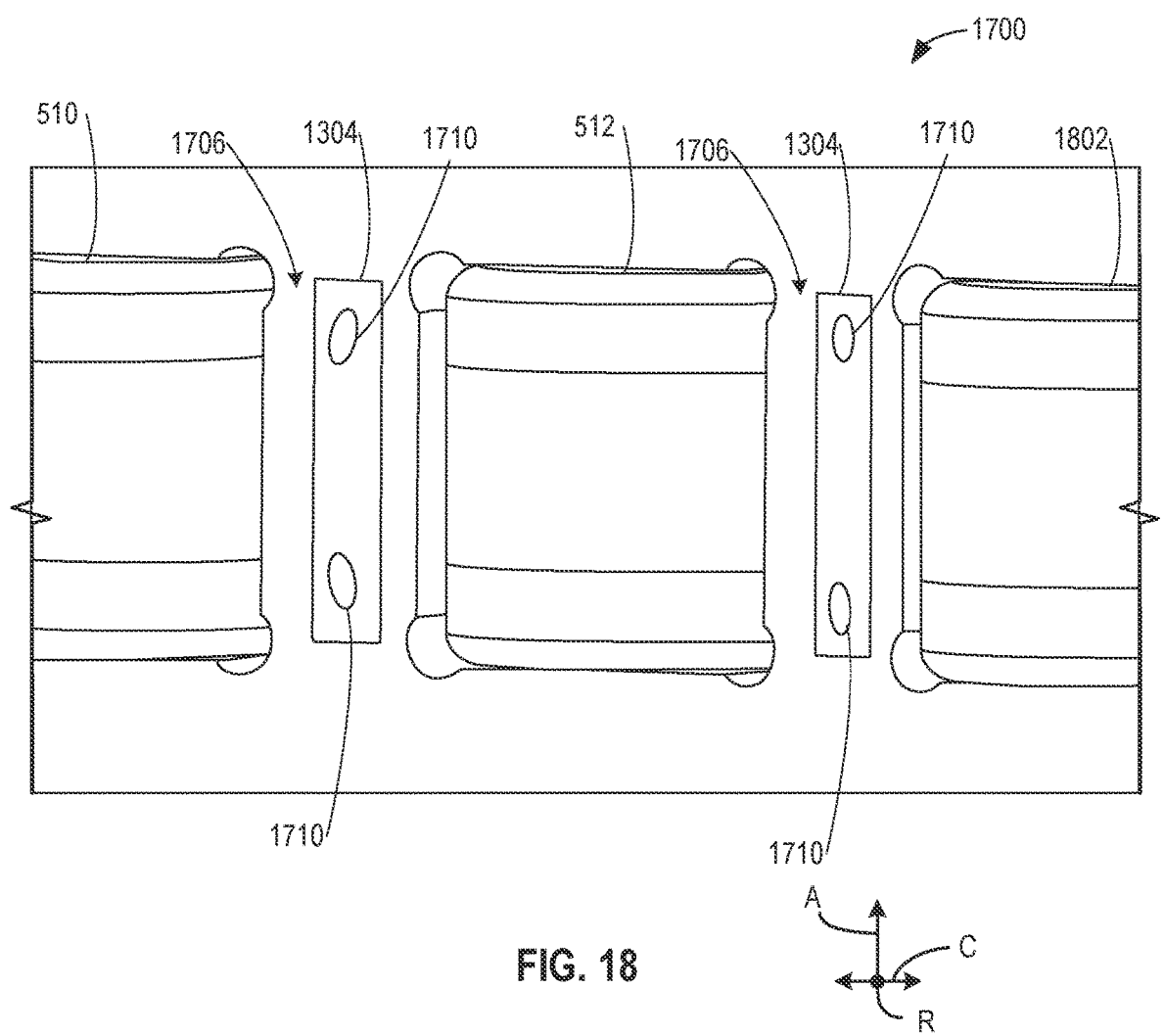
FIG. 18 is a partial perspective view of a bearing cage utilized in the bearing assemblies of FIGS. 12-15.

FIG. 18 is another view (e.g., a radially outward view) of the bearing assembly 1700 of FIG. 17. Although FIG. 18 is described with reference to the bearing assembly 1700 of FIG. 17, at least some of FIG. 18 and the related description also communicates details associated with the indentation 1304 in the bearing assemblies 1300, 1400, 1500 of FIGS. 13-16. As shown in FIG. 18, the indentations 1304 are positioned in the axial segments 1706 between adjacent roller bearings 510, 512, 1802. As also shown in FIG. 18, the inlets 1710 of the conduits 1708 (FIG. 17) are defined in the indentations 1304. Further, the conduits 1708 extend to the outer axial surfaces 1714 of the cage 1702 where the outlets 1712 (FIG. 17) are defined.

In the illustrated example of FIG. 18, the inlets 1710 include a circular cross-sectional shape (elliptical cross-sectional shape of inlets 1710 in FIG. 18 is due to the position of the inlets 1710 in the indentation 1304 and the partial perspective shown by FIG. 18). Accordingly, the conduits 1708 and the outlets 1712 also include the circular cross-sectional geometry. Alternatively, the inlets 1710, the outlets 1712, and the conduits 1708 may include an elliptical cross-sectional shape. For example, the cross-sectional shape of the conduits 1708 and the associated inlets 1710 and outlets 1712 is defined based on desired and/or predefined flow characteristics for the lubricant being directed out of the cavity 1312. Thus, the cross-sectional shape of the conduits 1708 and the associated inlets 1710 and outlets 1712 help maintain a desired and/or predefined amount of lubricant in the cavity 1312 while also directing lubricant out of the cavity 1312 to reduce the heat that the lubricant generates and/or collects (e.g., by about 20% compared to known bearing assemblies) during operation.

Figure 19A:
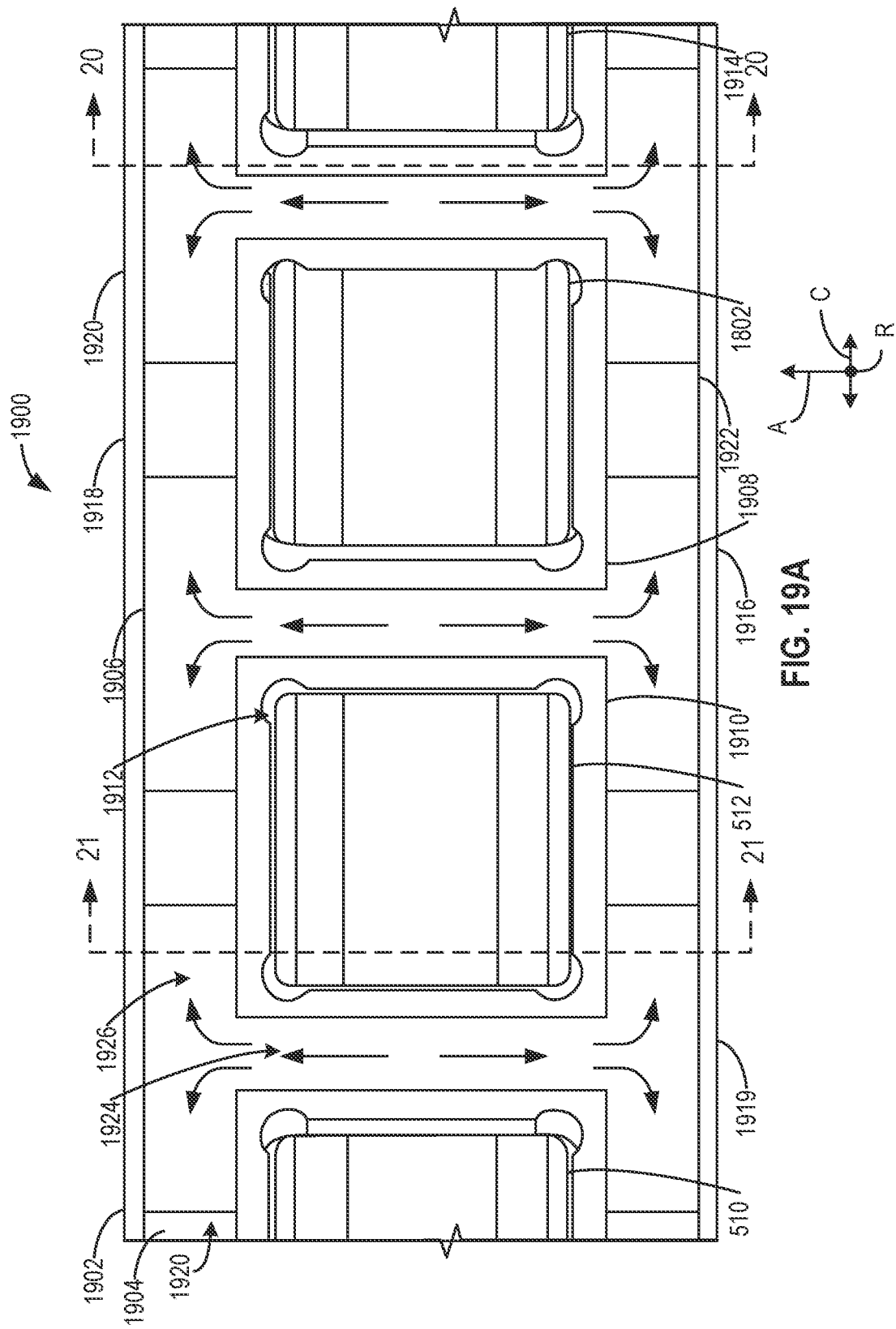
FIG. 19A is a partial perspective view of another bearing assembly representative of the bearing assembly of FIG. 2A and/or the bearing assembly of FIG. 2B.

FIG. 19A is another view (e.g., a radially outward view, a schematic view) of another example bearing assembly 1900 including a cage 1902 that may be utilized in the bearing assemblies 100, 200 of FIGS. 2A and/or 2B. In particular, FIG. 19A illustrates an inner radial surface 1904 of the cage 1902. The inner radial surface 1904 of the cage includes grooves 1906 (e.g., slots, indents, raised portions, etc.) and support surfaces 1908 that extend radially inward of the grooves 1906 (e.g., closer to an axial centerline of the bearing assembly 1900 (e.g., the centerline axis 12 (FIG. 1))).

First portions 1910 of the support surfaces 1908 are positioned around perimeters of respective slots 1912 in which roller bearings 510, 512, 1802, 1914 are positioned. Second portions 1916 of the support surfaces 1908 are positioned around outer axial edges 1918 of circumferential segments 1920 of the cage 1902. In particular, the circumferential segments 1920 of the cage 1902 are defined on opposite axial sides of the roller bearings 510, 512, 1802, 1914 and span in the circumferential direction C defined by the bearing assembly 1900. As such, outer axial surfaces of the second portions 1916 of the support surfaces 1908 define a portion of outer axial surfaces 1919 of the cage 1902. Further, third portions 1922 of the support surfaces 1908 are positioned intermittently between the first portions 1910 and the second portions 1916. In particular, the third portions 1922 of the support surfaces 1908 are positioned in the circumferential segments 1920 and connect to the first portions 1910 and the second portions 1916. The third portions 1922 of the support surfaces 1908 enable axial portions 1924 of the grooves 1906 (e.g., portions of the grooves 1906 in the axial segments of the cage 1902) to be contiguous with circumferential portions 1926 of the grooves 1906 (e.g., portions of the grooves 1906 in the circumferential segments 1920). In FIG. 19A, segments of the circumferential portions 1926 of the grooves 1906 are defined intermittently and separated by the third portions 1922 of the support surfaces 1908. Alternatively, the circumferential portions 1926 may be contiguous around an inner circumference defined by the circumferential segments 1920 of the cage 1902, as discussed in association with FIG. 19B.

The grooves 1906 define passageways for lubricant to flow out of a cavity defined between adjacent roller bearings 510, 512, 1802, 1914, the inner race 804 (not shown) and the cage 1902 (e.g., the cavity 524 of FIGS. 5-6, the cavity 826 of FIGS. 8 and 11, the cavity 1312 of FIGS. 13-15). In particular, during operation, the centrifugal force and/or tangential force encountered by the lubricant moves the lubricant into the axial portions 1924 of the grooves 1906. Filling of the axial portions 1924 causes the lubricant to flow into the circumferential portions 1926 of the grooves 1906. Further, inlets of conduits are defined in surfaces of the circumferential portions 1926 of the grooves 1906 such that the lubricant enters the conduits. Outlets of the conduits are defined in an outer radial surface and/or the outer axial surfaces 1919 of the cage 1902. As such, the grooves 1906 and the conduits in fluid connection with the grooves 1906 enable the lubricant to exit the bearing assembly 1900 to prevent the lubricant from generating and/or encountering additional viscous and/or frictional heat that may otherwise alter material properties associated with the lubricant.

Furthermore, the support surfaces 1908 support and/or guide movement of the cage 1902 and the roller bearings 510, 512, 1802, 1914 along the inner race 804. In particular, the support surfaces 1908 contact, or are positioned closer to, the cage landings 814 of the inner race 804 (FIG. 8) to help support a radial load of the cage 1902. When the support surfaces 1908 are not in direct contact with the cage landings 814 of the inner race 804, a thin layer of lubricant or another fluid (e.g., air) is positioned between the inner race 804 and the support surfaces 1908 to transfer loads between the inner race 804 and the support surfaces 1908. The first portions 1910 of the support surfaces 1908 may include weirs (e.g., the weir 610 (FIG. 6), the weir 704 (FIG. 7), the weir 822 (FIGS. 8 and/or 10), the weir 1104 (FIGS. 11 and/or 12)) proximate the roller bearings 510, 512, 1802, 1914 to maintain a certain amount of the lubricant on or near a surface of the roller bearings 510, 512, 1802, 1914. Additionally, the second portions 1916 of the support surfaces 1908 may be positioned around outer axial surfaces of the inner race 804 to maintain an alignment of the cage 1902 and the roller bearings 510, 512, 1802, 1914 relative to the inner race 804.

Figure 19B:
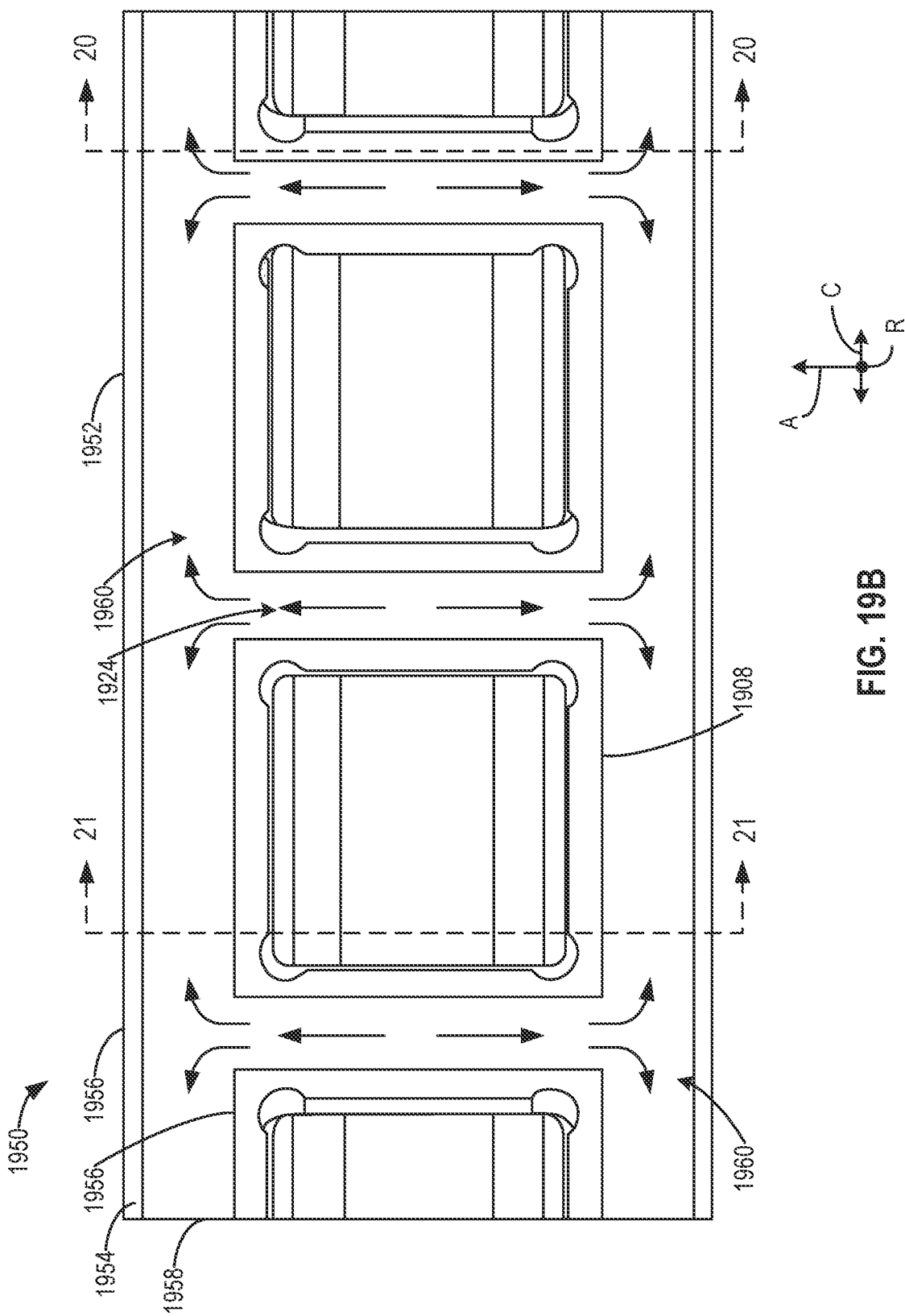
FIG. 19B is a partial perspective view of another bearing assembly representative of the bearing assembly of FIG. 2A and/or the bearing assembly of FIG. 2B.

FIG. 19B is another view (e.g., a radially outward view, a schematic view) of another example bearing assembly 1950 including a cage 1952 that may be utilized in the bearing assemblies 100, 200 of FIGS. 2A and/or 2B. In particular, FIG. 19B illustrates an inner radial surface 1954 of the cage 1952 similar to FIG. 19A. The cage 1952 includes support surfaces 1956 and grooves 1958. In particular, the support surfaces 1956 include the first portion 1910 positioned around the slots 1912 and the second portion 1916 positioned around the outer axial edges 1918 of the circumferential segments 1920 of the cage 1952. That is, the support surfaces 1956 of FIG. 19B do not include the third portion 1922 of the support surfaces 1908 of FIG. 19A. The grooves 1958 include the axial portions 1924 and circumferential portions 1960. The circumferential portions 1960 are contiguous with the axial portions 1924 and extend around a circumference of the inner radial surface 1954 on opposite axial sides of the roller bearings 510, 512, 1802, 1914.

Figure 20:
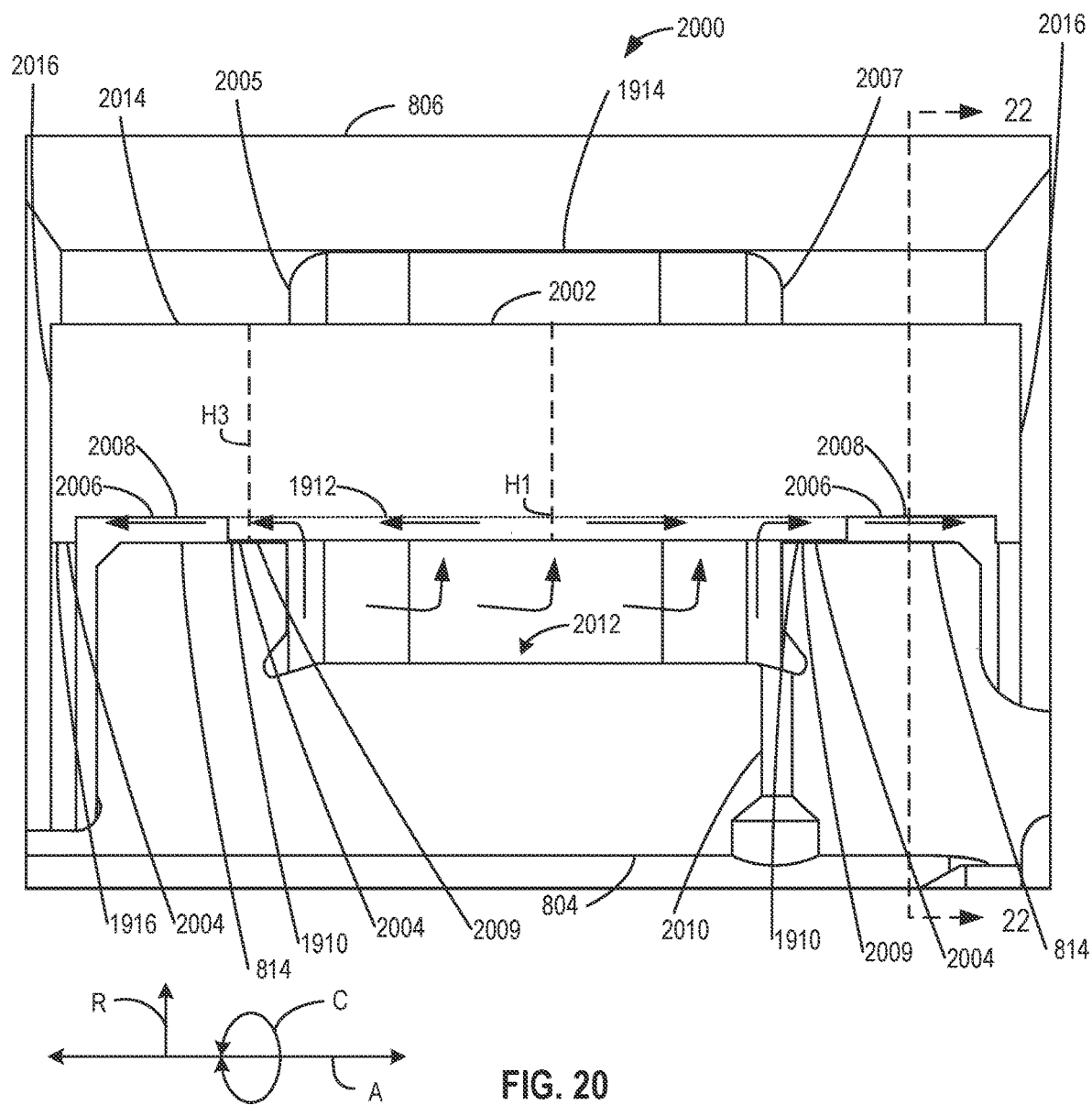
FIG. 20 is a schematic, circumferential cross-sectional view of the bearing assemblies of FIGS. 19A and 19B.

FIG. 20 illustrates a cross-sectional view of a bearing assembly 2000 representative of the bearing assemblies 1900, 1950 taken through the 20-20 section line of FIGS. 19A and 19B. As shown in FIG. 20, the bearing assembly 2000 includes a cage 2002 (e.g., the cage 1902 of FIG. 19A, the cage 1952 of FIG. 19B), the inner race 804, the outer race 806, and the roller bearing 1914 positioned in one of the slots 1912 of the cage 2002, which is shown by a dashed line as it would be positioned in this view. The cage 2002 includes support surfaces 2004 (e.g., the support surfaces 1908 of FIG. 19A, the support surfaces 1956 of FIG. 19B) and grooves 2006 (e.g., the grooves 1906 of FIG. 19A, the grooves 1958 of FIG. 19B). The slots 1912 are positioned adjacent to the support surfaces 2004 and connect the grooves 2006 on opposite axial sides of the roller bearing 1914. As shown in FIG. 20, the support surfaces 2004 include the first portion 1910 and the second portion 1916. The support surfaces 2004 may also include the third portion 1922 (FIG. 19A). The first portion 1910 of the support surfaces 2004 extends past axial ends 2005, 2007 of the roller bearing 1914 and is positioned over inner axial portions 2009 of the cage landings 814 of the inner race 804.

A portion of the first portion 1910 of the support surfaces 2004 may have the first height H1, while the cage landings 814 are separated from an outer radial surface 2014 of the cage 2002 by the third distance H3 (FIG. 8) and extend between the cage landings 814 in the axial direction A. That is, the first portion 1910 of the support surfaces 2004 may include a weir (e.g., the weir 610 (FIG. 6), the weir 704 (FIG. 7), the weir 822 (FIGS. 8 and/or 10), the weir 1104 (FIGS. 11 and/or 12)) to maintain lubricant proximate the roller bearing 1914.

The grooves 2006 include the axial portions 1924 (FIGS. 19A and 19B) and circumferential portions 2008 (e.g., the circumferential portions 1926 of FIG. 19A, the circumferential portions 1960 of FIG. 19B). The axial portions 1924 are positioned on a circumferential side of the first portion 1910 of the support surfaces 2004 opposite the slot 1912 in which the roller bearing 1914 is positioned. The circumferential portions 2008 are contiguous with at least one of the axial portions 1924 and extend in the circumferential direction C between the first portion 1910 and the second portion 1916 of the support surfaces 2004 in the axial direction A.

As also shown in FIG. 20, the bearing assembly 2000 includes a lubricant spout 2010 that provides lubricant to a cavity 2012 defined between the roller bearing 1914, the roller bearing 1802 (FIGS. 18, 19A, and 19B), the inner race 804, and the cage 2002. The bearing assembly 2000, and other bearing assemblies described herein, may include any number of lubricant spouts extending through the inner race 804 and positioned intermittently in the circumferential direction C.

During operation, the lubricant in the cavity 2012 is driven into the axial portion 1924 (FIGS. 19A and 19B) of the grooves 2006 between the roller bearings 1914, 1802 (FIGS. 18, 19A, and 19B). The lubricant in the axial portion 1924 of the grooves 2006 flows in an axial direction A into the circumferential portions 2008. For example, the lubricant in the axial portion 1924 of the grooves 2006 flows in the axial direction A as a result of a rotational inertia of the lubricant and/or the cavity 2012 receiving more lubricant via the lubricant spout 2010. Additionally or alternatively, the first portion 1910 of the support surfaces 1908 can include a bend in the circumferential direction C that causes the lubricant to flow in axial directions A towards the respective circumferential portions 2008 of the grooves 2006 as a result of a rotational inertia associated with the lubricant. Additionally or alternatively, a mid-axial section of the axial portions 1924 can extend closer to the axis about which the cage 2002 rotates than outer axial sections of the axial portions 1924 to cause the lubricant to flow towards the circumferential portions 2008. Further, conduits (not shown in this view) in fluid connection with the circumferential portions 2008 of the grooves 2006 transport the lubricant to the outer radial surface 2014 and/or outer axial surfaces 2016 of the cage 2002. In some examples, inlets of conduits may also be defined in the axial portion 1924 of the groove 2006, similar to the conduits 1110 (FIGS. 11-12), the conduit 1310 (FIG. 13), the conduits 1408 (FIG. 14), the conduits 1508 (FIGS. 15-16), and/or the conduits 1708 (FIG. 17).

Figure 21A:
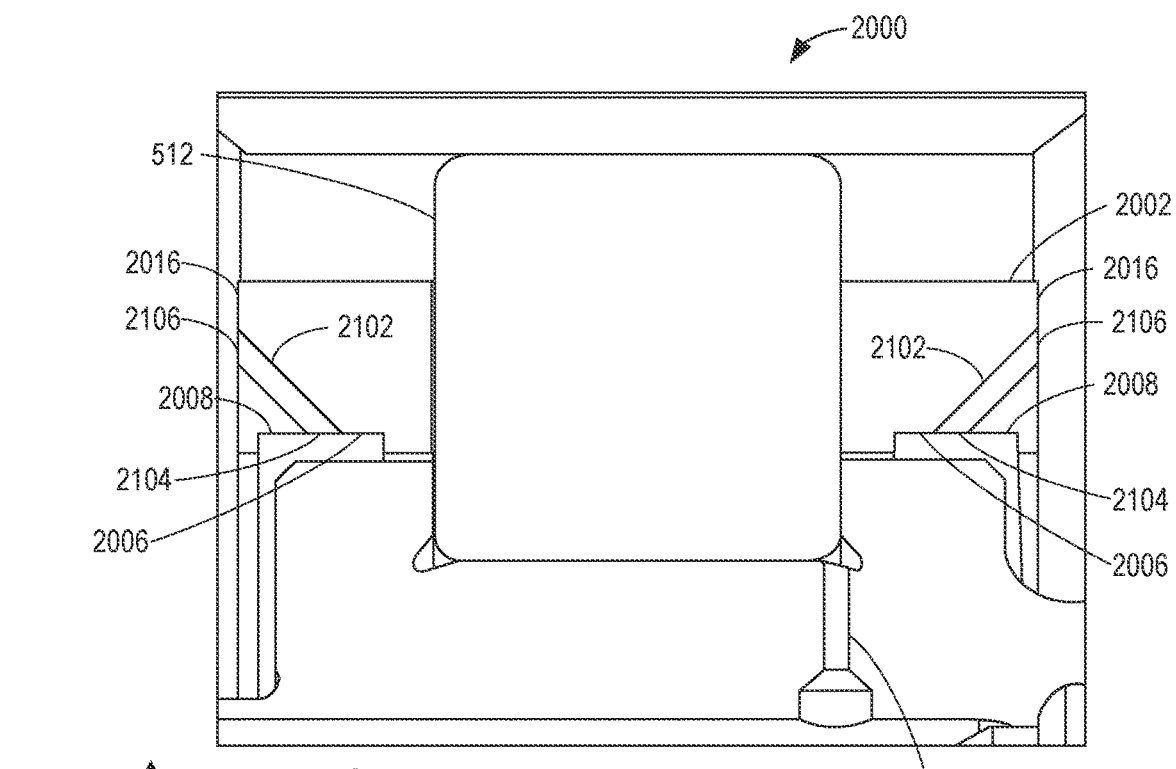
FIG. 21A is another schematic, circumferential cross-sectional view of the bearing assemblies of FIGS. 19A and 19B.

FIG. 21A illustrates a first example cross-sectional view of the bearing assembly 2000 (e.g., the bearing assemblies 1900, 1950 of FIGS. 19A and/or 19B) taken through the 21-21 section line of FIGS. 19A and 19B. As shown in FIG. 21A, the cage 2002 includes conduits 2102 extending between the circumferential portions 2008 of the grooves 2006 and the outer axial surfaces 2016. As a result, the lubricant can enter the conduits 2102 via inlets 2104 defined in the circumferential portions 2008 of the grooves 2006. Further, the lubricant can exit the conduits 2102 and, more generally, the bearing assembly 2000 via outlets 2106 defined in the outer axial surfaces 2016. Thus, the outlets 2106 are offset from the inlets 2104 in the axial direction A. Accordingly, the conduits 2102 are oblique relative to the axial direction A and the radial direction R. The inlets 2104 and the outlets 2106 may additionally or alternatively be offset in the circumferential direction C. Additionally, the conduits 2102 are aligned with the roller bearing 512 in circumferential direction C defined by the bearing assembly 2000. After flowing through the outlets 2106, the lubricant can flow through a lubricant treatment system and/or flow through one or more conduits that return the lubricant to the bearing assembly 2000 (e.g., via the lubricant spout 2010).

Figure 21B:
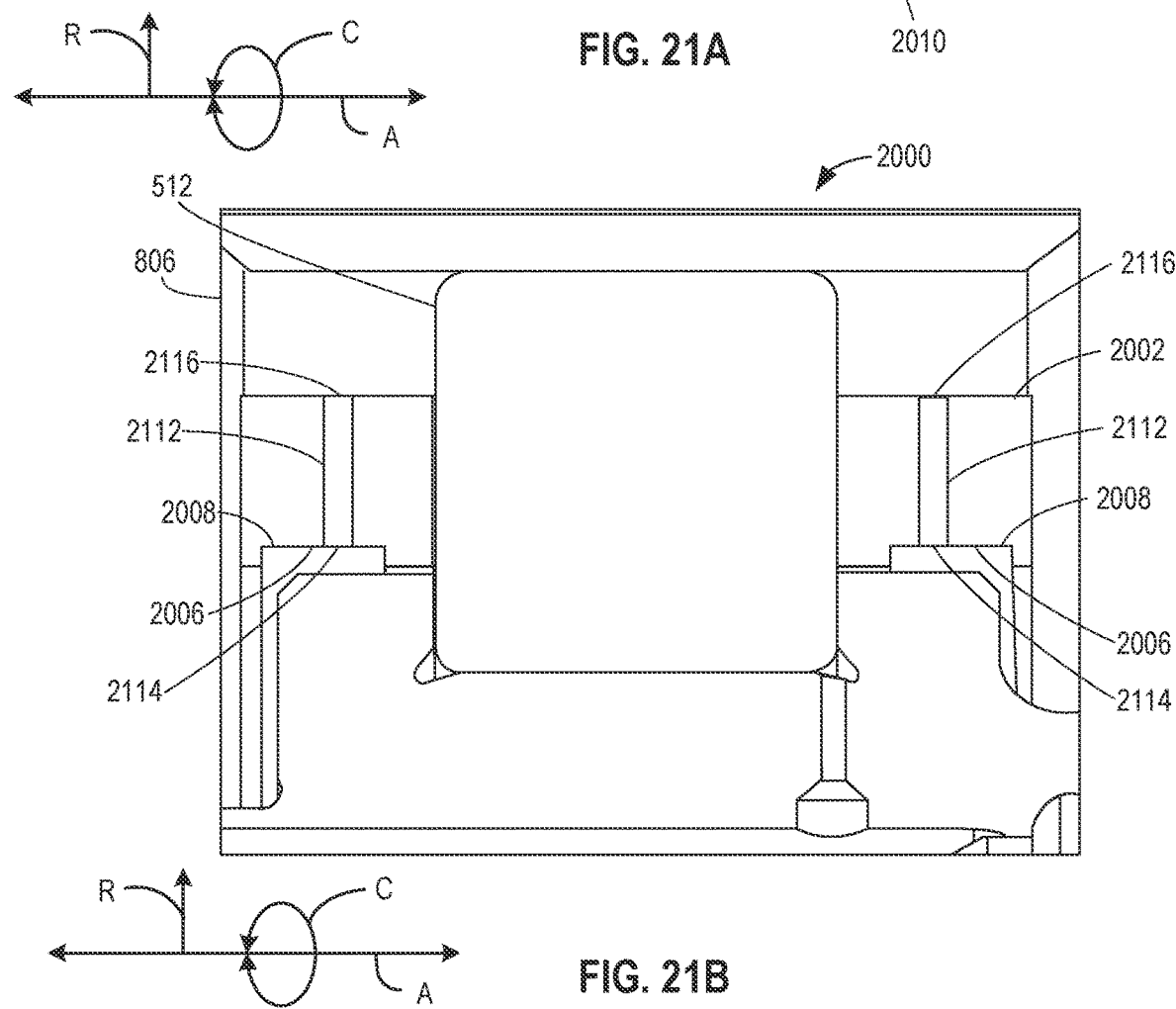
FIG. 21B is another schematic, circumferential cross-sectional view of the bearing assemblies of FIGS. 19A and 19B.

FIG. 21B illustrates another example cross-sectional view of the bearing assembly 2000 (e.g., the bearing assemblies 1900, 1950 of FIGS. 19A and/or 19B) taken through the 21-21 section line of FIGS. 19A and 19B. As shown in FIG. 21B, the cage 2002 includes conduits 2112 extending between the circumferential portions 2008 of the grooves 2006 and the outer radial surface 2014. As a result, the lubricant can enter the conduits 2112 via inlets 2114 defined in the circumferential portions 2008 of the grooves 2006, and the lubricant can exit the conduits 2112 via outlets 2116 defined in the outer radial surface 2014. Thus, the outlets 2116 are aligned with the inlets 2114 in the axial direction A. Additionally, the conduits 2112 are aligned with the roller bearing 512 in circumferential direction C defined by the bearing assembly 2000. After flowing through the outlets 2106, the lubricant can exit the bearing assembly 2000 and/or provide lubrication between the outer race 806 and the roller bearing 512.

Figure 21C:
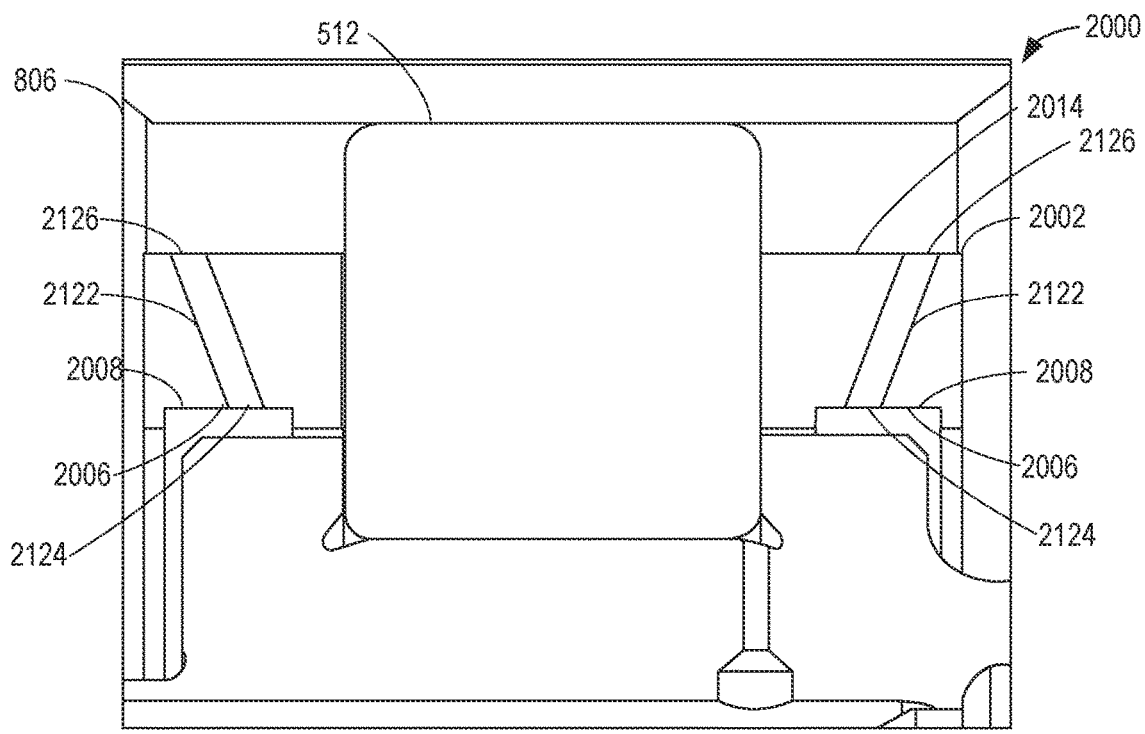
FIG. 21C is another schematic, circumferential cross-sectional view of the bearing assemblies of FIGS. 19A and 19B.

FIG. 21C illustrates another example cross-sectional view of the bearing assembly 2000 (e.g., the bearing assemblies 1900, 1950 of FIGS. 19A and/or 19B) taken through the 21-21 section line of FIGS. 19A and 19B. As shown in FIG. 21C, the cage 2002 includes conduits 2122 extending between the circumferential portions 2008 of the grooves 2006 and the outer radial surface 2014. Inlets 2124 of the conduits 2122 are offset from outlets 2126 of the conduits 2122 in the axial direction A. In particular, the inlets 2124 are positioned closer than the outlets 2126 to the roller bearing 512 in the axial direction A. As a result, the conduits 2122 carry the lubricant radially outward and away from the roller bearing 512 in the axial direction A. In some examples, the conduits 2122 cause a first portion of the lubricant that flows through the outlet 2126 to exit the bearing assembly 2000 and cause a second portion of the lubricant that flows through the outlet 2126 to provide lubrication between the outer race 806 and the roller bearing 512. In some such examples, the first portion of the lubricant is greater than the second portion of the lubricant.

Figure 21D:
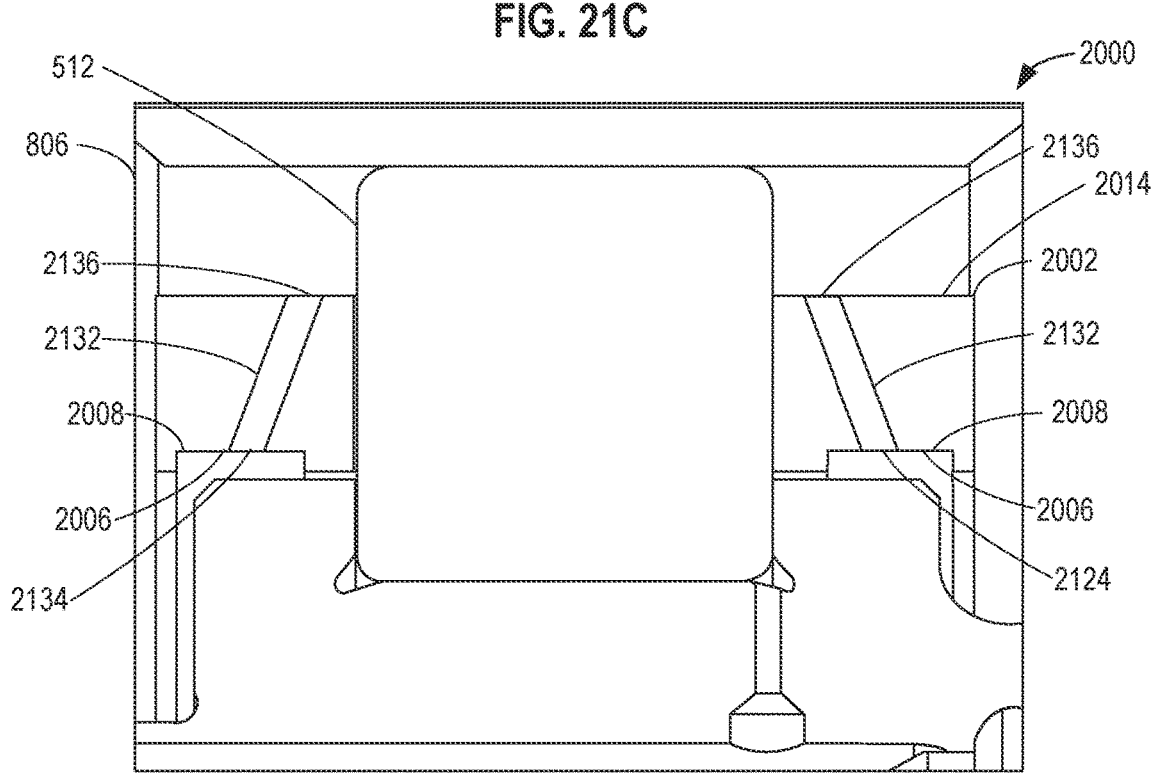
FIG. 21D is another schematic, circumferential cross-sectional view of the bearing assemblies of FIGS. 19A and 19B.

FIG. 21D illustrates another example cross-sectional view of the bearing assembly 2000 (e.g., the bearing assemblies 1900, 1950 of FIGS. 19A and/or 19B) taken through the 21-21 section line of FIGS. 19A and 19B. As shown in FIG. 21D, the cage 2002 includes conduits 2132 extending between the circumferential portions 2008 of the grooves 2006 and the outer radial surface 2014. Inlets 2134 of the conduits 2132 are offset from outlets 2136 of the conduits 2132 in the axial direction A. In particular, the outlets 2136 are positioned closer than the inlets 2134 to the roller bearing 512 in the axial direction A. As a result, the conduits 2132 carry the lubricant radially outward and towards the roller bearing 512 in the axial direction A. In some examples, the conduits 2132 cause a first portion of the lubricant that flows through the outlet 2136 to exit the bearing assembly 2000 and cause a second portion of the lubricant that flows through the outlet 2136 to provide lubrication between the outer race 806 and the roller bearing 512. In some such examples, the second portion of the lubricant is greater than the first portion of the lubricant.

Figure 22A:
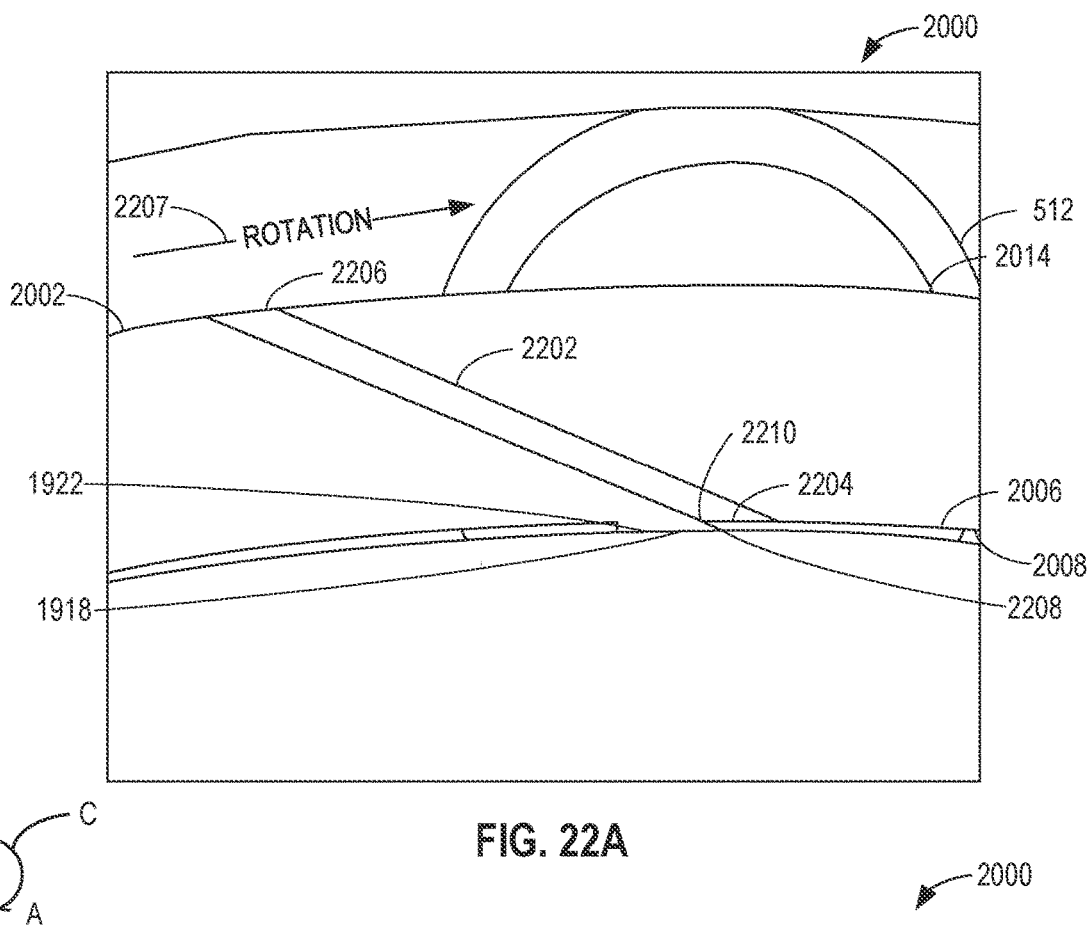
FIG. 22A is a schematic, axial cross-sectional view of the bearing assembly of FIG. 2B.
Figure 22B:
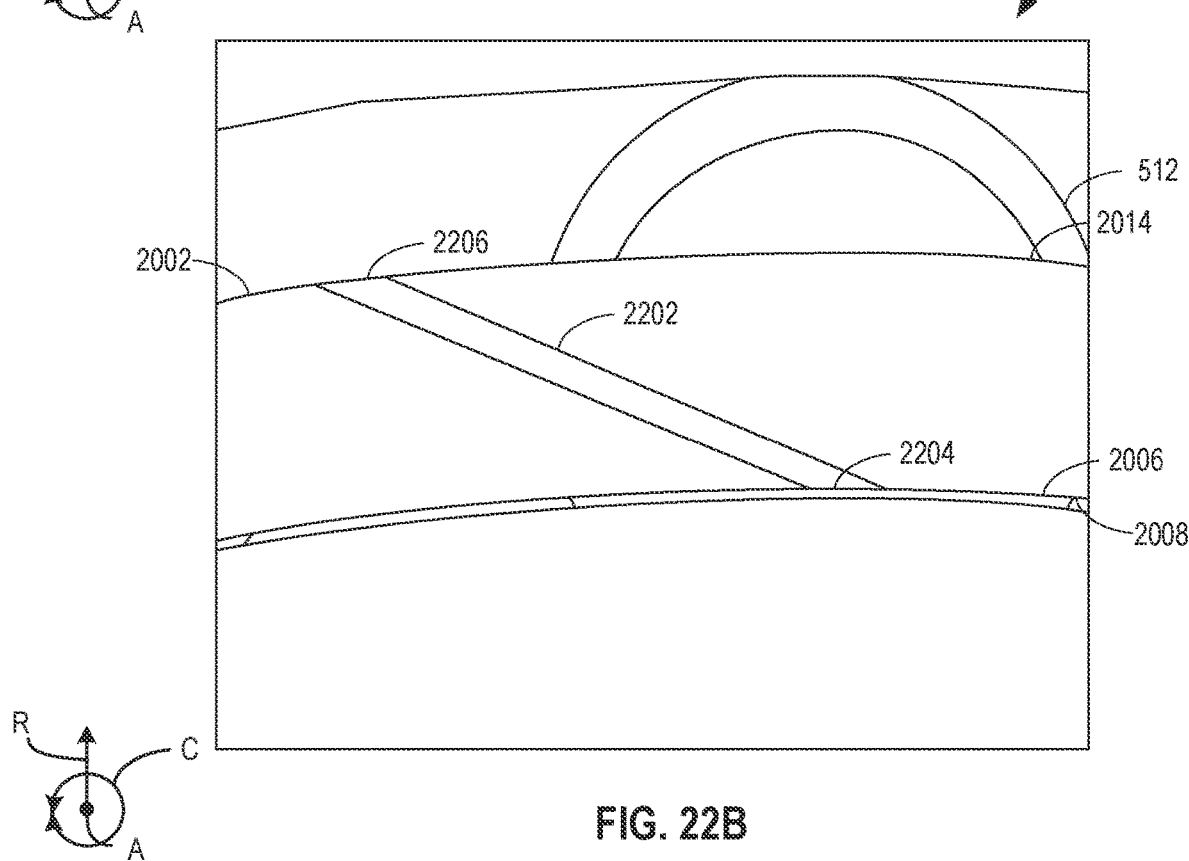
FIG. 22B is another schematic, axial cross-sectional view of the bearing assembly of FIG. 2B.

FIGS. 22A-22B illustrate example cross-sectional views of the bearing assembly 2000 (e.g., the bearing assemblies 1900, 1950 of FIGS. 19A and/or 19B) taken through the 22-22 section line of FIG. 20. In particular, in FIG. 22A, the cross-section of the bearing assembly 2000 is representative of the bearing assembly 1900 of FIG. 19A and includes the third portion 1922 of the support surfaces 1908. In FIG. 22B, the cross-section of the bearing assembly 2000 is representative of the bearing assembly 1950 of FIG. 19B and does not include the third portion 1922 of the support surfaces 1908.

As shown in FIGS. 22A-22B, the cage 2002 includes a conduit 2202 extending between the circumferential portions 2008 of the grooves 2006 and the outer radial surface 2014. An inlet 2204 of the conduit 2202 is offset relative to an outlet 2206 of the conduit 2202 in the circumferential direction C. As such, the conduit 2202 is oblique in the radial direction R. In particular, the outlet 2206 trails the inlet 2204 in a direction of rotation 2207 of the cage 2002 (e.g., a clockwise rotation, the direction of rotation 1320 (FIG. 13)). As a result, the rotational inertia of the lubricant helps the lubricant flow into and through the conduit 2202 at a faster rate. The outlet 2206 may also be offset from the inlet 2204 in the axial direction A.

In FIGS. 22A-22B, the inlet 2204 is aligned with the roller bearing 512 in the circumferential direction C, and the outlet 2206 is positioned between the roller bearing 512 and a trailing roller bearing (e.g., the roller bearing 510 (FIGS. 19A-19B)) in the circumferential direction C. Alternatively, the inlet 2204 and the outlet 2206 may both be positioned between the roller bearings 510, 512, or the inlet 2204 may be positioned between the roller bearings 512, 1802 and the outlet may be aligned with the roller bearing 512 in the circumferential direction C.

During operation, a centrifugal force on and/or a rotational inertia of the lubricant in the circumferential portion 2008 of the grooves 2006 pushes the lubricant through the inlet 2204 into the conduit 2202. As shown in FIG. 22A, a leading edge 2208 of the third portion 1922 of the support surfaces 1908 is aligned with (e.g., flush with) a trailing portion 2210 of the inlet 2204. As such, the leading edge 2208 may help guide the lubricant radially outwards from the circumferential portion 2008 of the grooves 2006 into the conduit 2202.

Figure 23:
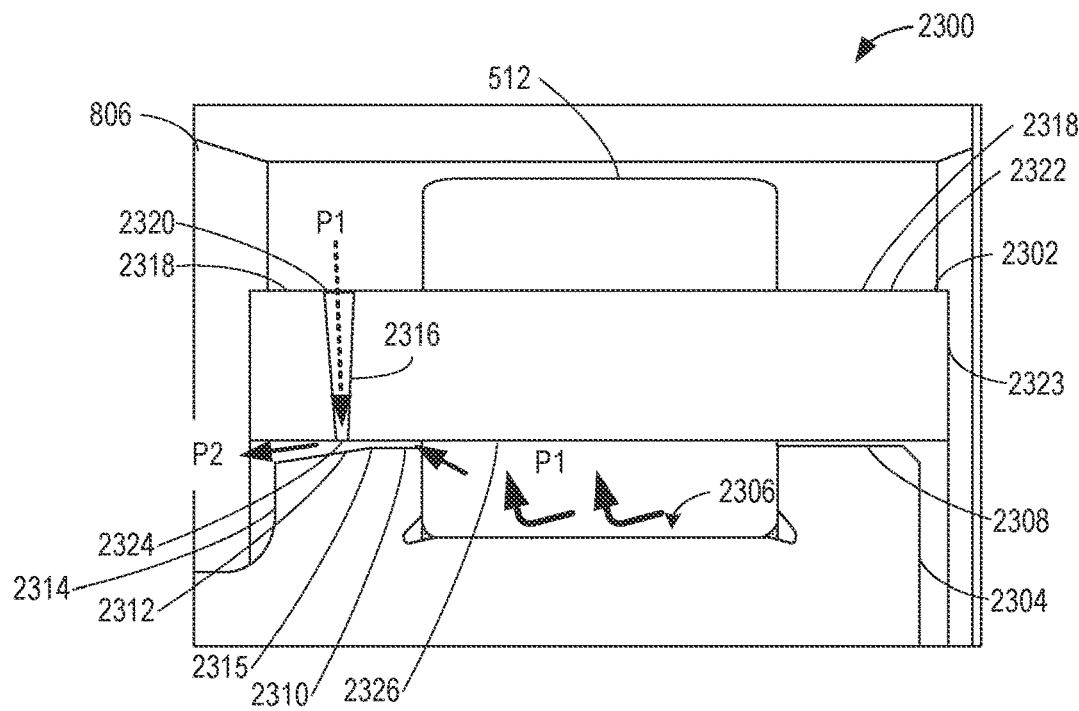
FIG. 23 is a schematic, circumferential cross-sectional view of another bearing assembly representative of the bearing assembly of FIG. 2A and/or the bearing assembly of FIG. 2B.

FIG. 23 is a schematic, circumferential cross-sectional view of another bearing assembly 2300 including a cage 2302 that may be utilized in the bearing assembly 100 of FIG. 2A and/or the bearing assembly 200 of FIG. 2B. Accordingly, the cage 2302 is representative of the cage 102 of FIGS. 2A-2B. As shown in FIG. 23, the bearing assembly 2300 also includes the roller bearing 512 positioned between an inner race 2304 and the outer race 806. Lubricant is positioned in a cavity 2306 between the cage 2302, the inner race 2304, the roller bearing 512, and an adjacent roller bearing (e.g., the roller bearing 510 (FIG. 5)).

The inner race 2304 also includes a cage landing 2308 (e.g., a shoulder, a raised axial end, a rim, etc.). The cage landing 2308 includes a first portion 2310 proximate the cavity 2306 and a second portion 2312 bordering (e.g., on an axial side of) the first portion 2310 opposite the cavity 2306. The second portion 2312 of the cage landing 2308 extends to an outer axial surface 2314 of the inner race 2304. The first portion 2310 of the cage landing 2308 is approximately level in the axial direction A. The second portion 2312 of the cage landing 2308 is angled to define an increasing separation between the cage 2302 and the inner race 2304 towards the outer axial surface 2314. That is, the bearing assembly 2300 includes a first separation between the first portion 2310 of the cage landing 2308 and an inner radial surface 2326 of the cage 2302. Further, the bearing assembly 2300 includes a second separation between the second portion 2312 of the cage landing 2308 and the inner radial surface of the cage 2302 at an end of the cage landing 2308 (e.g., adjacent to the outer axial surface 2314) that is greater than the first separation. A plurality of the second portion 2312 are defined intermittently in the circumferential direction C. As a result, outer axial portions of the cage 2302 are supported between adjacent second portions 2312. Moreover, the second portion 2312 of the cage landing 2308 defines an approximately constant adjustment (e.g., slope) between the first separation and the second separation. Thus, the first portion 2310 and the second portion 2312 of the cage landing 2308 form an angle that is greater than 180 degrees (°) across a transition point 2315 from the first portion 2310 to the second portion 2312. Accordingly, the second portion 2312 of the cage landing 2308 is oblique relative to the axial direction A.

In FIG. 23, the cage 2302 includes a tapered conduit 2316 positioned in a circumferential portion 2318 of the cage 2302. In particular, the circumferential portion 2318 of the cage 2302 is aligned with the cage landing 2308 in the axial direction A. An inlet 2320 of the tapered conduit 2316 is defined at an outer radial surface 2322 of the cage 2302. Alternatively, the inlet 2320 of the tapered conduit 2316 may be defined in an outer axial surface 2323 of the cage 2302. An outlet 2324 of the tapered conduit 2316 is defined at the inner radial surface 2326. The outlet 2324 of the tapered conduit 2316 and the second portion 2312 of the cage landing 2308 are aligned in the axial direction A. The inlet 2320 and the outlet 2324 are also aligned in the axial direction A. Additionally, the inlet 2320 and the outlet 2324 are aligned in the circumferential direction C and positioned between the roller bearing 512 and an adjacent roller bearing (e.g., the roller bearing 510 (FIG. 5)) in the circumferential direction C. Alternatively, the inlet 2320 and the outlet 2324 may be offset in the axial direction A and/or the circumferential direction C, as discussed in further detail below.

The inlet 2320 includes a first cross-sectional area, and the outlet 2324 includes a second cross-sectional area smaller than the first cross-sectional area. Moreover, the change in cross-sectional area between the inlet 2320 and the outlet 2324 is approximately constant. During operation, the tapered conduit 2316 encounters a first fluid pressure P1 proximate the inlet 2320 and a second fluid pressure P2 less than the first fluid pressure P1 proximate the outlet 2324. The difference between the first fluid pressure P1 at the inlet 2320 and the second fluid pressure P2 at the outlet 2324 causes a fluid (e.g., air) in a region radially outward of the cage 2302 to flow radially inward toward the cage landing 2308. Furthermore, the cavity 2306 includes the first fluid pressure P1 or another fluid pressure that is greater than the second fluid pressure P2.

As shown in FIG. 23, the transition point 2315 is positioned between the outlet 2324 of the tapered conduit 2316 and the cavity 2306 in the axial direction A. The transition point 2315 between the first portion 2310 and the second portion 2312 of the cage landing 2308 also defines an area of transition between the first pressure P1 and the second pressure P2. As such, a pressure between the second portion 2312 of the cage landing 2308 and the cage 2302 is less than a pressure between the first portion 2310 of the cage landing 2308 and the cage 2302. As a result, the pressure difference causes the lubricant in the cavity 2306 to flow out of the cavity 2306 towards the lower pressure between the second portion 2312 of the cage landing 2308 and the cage 2302. Further, the fluid exiting the tapered conduit 2316 proximate the second portion 2312 of the cage landing 2308 helps drive the lubricant out of the bearing assembly 2300. In turn, the lubricant can be discarded and/or flow through a thermal treatment and/or recirculation system that returns the lubricant to the bearing assembly 2300. Thus, the bearing assembly 2300 prevents the lubricant from being trapped in the cavity 2306 and continuously encountering and/or generating viscous and/or frictional heat. A size, shape, and/or position of the tapered conduit 2316, the angle defined by the first and second portions 2310, 2312 of the cage landing 2308, and/or a distance between the transition point 2315 and the outlet 2324 may be adjusted based on a rate at which the lubricant is to exit the cavity 2306.

Figure 24:
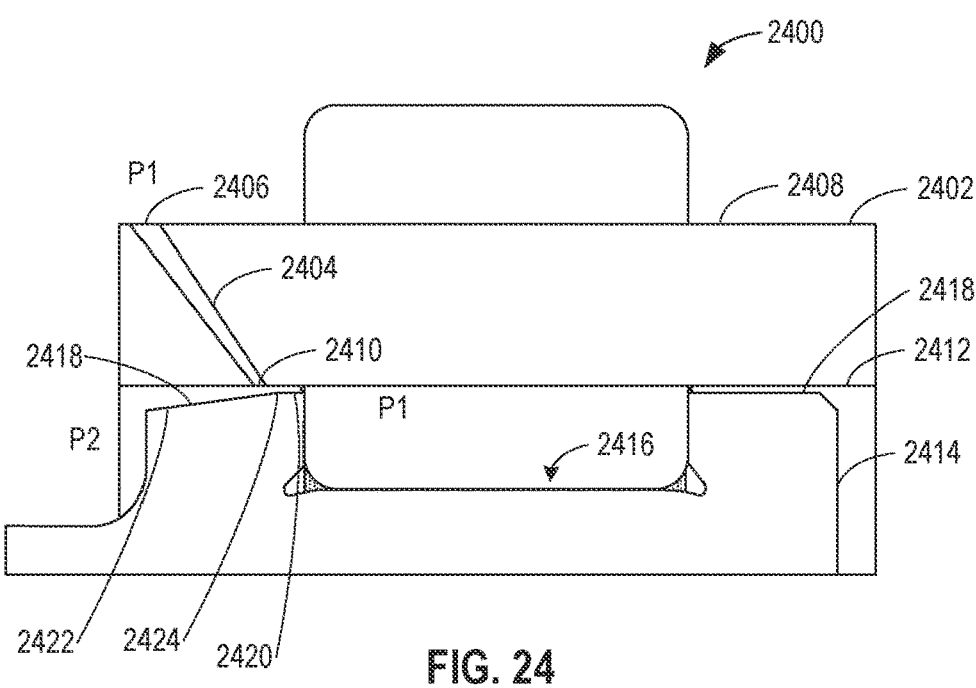
FIG. 24 is a schematic, circumferential cross-sectional view of another bearing assembly representative of the bearing assembly of FIG. 2A and/or the bearing assembly of FIG. 2B.

FIG. 24 is a schematic, circumferential cross-sectional view of another bearing assembly 2400 including a cage 2402 that may be utilized in the bearing assembly 100 of FIG. 2A and/or the bearing assembly 200 of FIG. 2B (e.g., the cage 102 of FIGS. 2A-2B). As shown in FIG. 24, the cage 2402 includes a tapered conduit 2404 extending between an inlet 2406 defined in an outer radial surface 2408 of the cage 2402 and an outlet 2410 defined in an inner radial surface 2412 of the cage 2402. In FIG. 24, the inlet 2406 and the outlet 2410 are aligned in the circumferential direction C and offset in the axial direction A. In particular, the outlet 2410 is defined between the inlet 2406 and the roller bearing 512 in the axial direction A.

In FIG. 24, the bearing assembly 2400 also includes an inner race 2414 and a cavity 2416 defined between the inner race 2414, the cage 2402, the roller bearing 512, and an adjacent roller bearing (e.g., the roller bearing 510 (FIG. 5)). The inner race 2414 includes a cage landing 2418 aligned with at least a portion of the tapered conduit 2404 in the axial direction A. The cage landing 2418 includes a first portion 2420 and a second portion 2422. A first axial end of the first portion 2420 borders the cavity 2416 and a second axial end of the first portion 2420 borders the second portion 2422. Similar to the first and second portions 2310, 2312 of the cage landing 2308 of FIG. 23, the first portion 2420 is approximately level in the axial direction A and the second portion 2422 is angled to increase a distance between the cage 2402 and the cage landing 2418 away from the first portion 2420 in the axial direction A. That is, the second portion 2422 includes a sharper height increase than the first portion 2420. A transition point 2424 in the cage landing 2418 between the first portion 2420 and the second portion 2422 (e.g., the second axial end of the first portion 2420) is closer than the outlet 2410 to the cavity 2416 in the axial direction A. Additionally, similar to the second portion 2312 of the cage landing 2308 of FIG. 23, a plurality of the second portion 2422 are defined intermittently in the circumferential direction C.

During operation, a pressure difference between the inlet 2406 and the outlet 2410 causes a fluid (e.g., air) to flow from an outer radial and/or axial area of the cage 2402 to an area between the cage 2402 and the second portion 2422 of the cage landing 2418. Additionally, the pressure difference between the cavity 2416 and the area between the cage 2402 and the second portion 2422 of the cage landing 2418 causes the lubricant in the cavity to flow between the cage 2402 and the cage landing 2418. The fluid flowing through the outlet 2410 helps drive the lubricant out of the area between the cage 2402 and the second portion 2422 of the cage landing 2418 such that the lubricant can be discarded and/or undergo thermal treatment before returning to the bearing assembly 2400.

Figure 25:
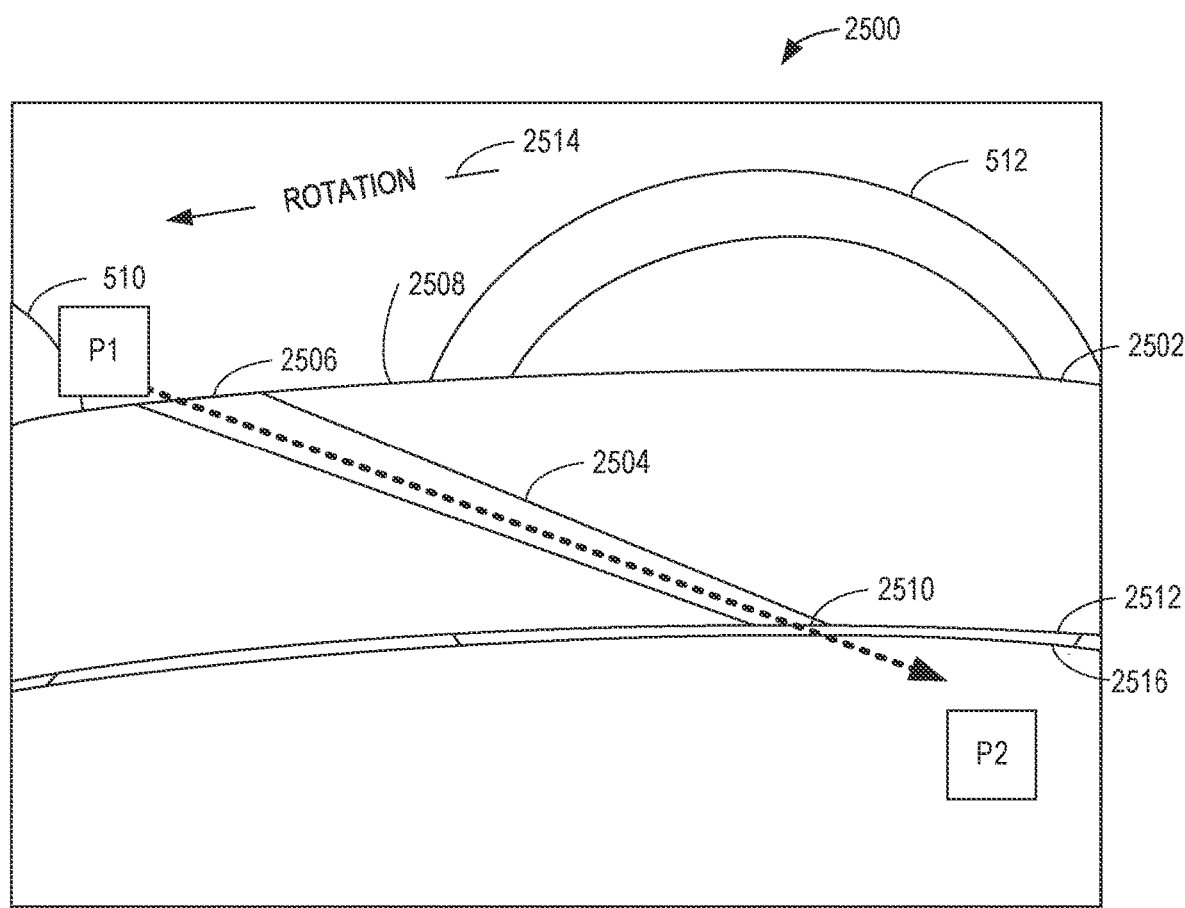
FIG. 25 is a schematic, axial cross-sectional view of another bearing assembly representative of the bearing assembly of FIG. 2A and/or the bearing assembly of FIG. 2B.
Figure 25:
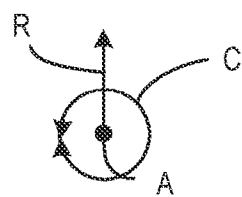

FIG. 25 is a schematic, axial cross-sectional view of another bearing assembly 2500 including another cage 2502 that may be utilized in the bearing assembly 100 of FIG. 2A and/or the bearing assembly 200 of FIG. 2B (e.g., the cage 102 of FIGS. 2A-2B). As shown in FIG. 25, the cage 2502 includes another tapered conduit 2504 having an inlet 2506 defined in an outer radial surface 2508 of the cage 2502 and an outlet 2510 defined in an inner radial surface 2512 of the cage 2502. The inlet 2506 and the outlet 2510 are offset in the circumferential direction C. In particular, the inlet 2506 defines a leading portion (e.g., a leading end) of the tapered conduit 2504 in a direction of rotation 2514 of the cage 2502. Accordingly, the outlet 2510 defines a trailing portion (e.g., a trailing end) of the tapered conduit 2504 in the direction of rotation 2514.

In FIG. 25, the inlet 2506 is positioned between the roller bearings 510, 512 in the circumferential direction C. The outlet 2510 is aligned with the roller bearing 512 in the circumferential direction C. In some examples, the outlet 2510 is positioned between the roller bearings 510, 512 in the circumferential direction C. Additionally or alternatively, the inlet 2506 may be aligned with the roller bearing 510 in the circumferential direction C.

During operation, the reduction in cross-sectional area from the inlet 2506 to the outlet 2510 in the tapered conduit 2504 forms a pressure difference that causes fluid (e.g., air) that is flowing along the outer radial surface 2508 to flow through the tapered conduit 2504 to the inner radial surface 2512. After exiting the tapered conduit 2504, the fluid encounters the lubricant in a slanted portion of a cage landing 2516 (e.g., the second portion 2312 of FIG. 23, the second portion 2422 of FIG. 24). As a result, a mixture of the fluid and the lubricant exits the bearing assembly 2500 between the cage 2502 and the cage landing 2516.

Figure 26A:
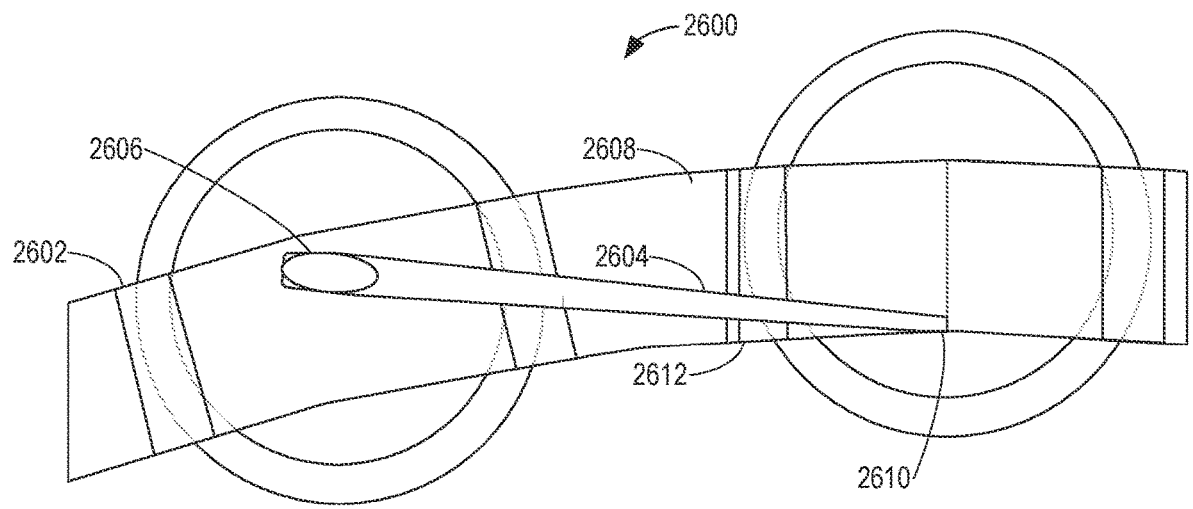
FIG. 26A is a schematic, axial view of another bearing assembly representative of the bearing assembly of FIG. 2A and/or the bearing assembly of FIG. 2B.
Figure 26A:
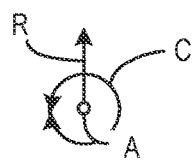
Figure 26B:
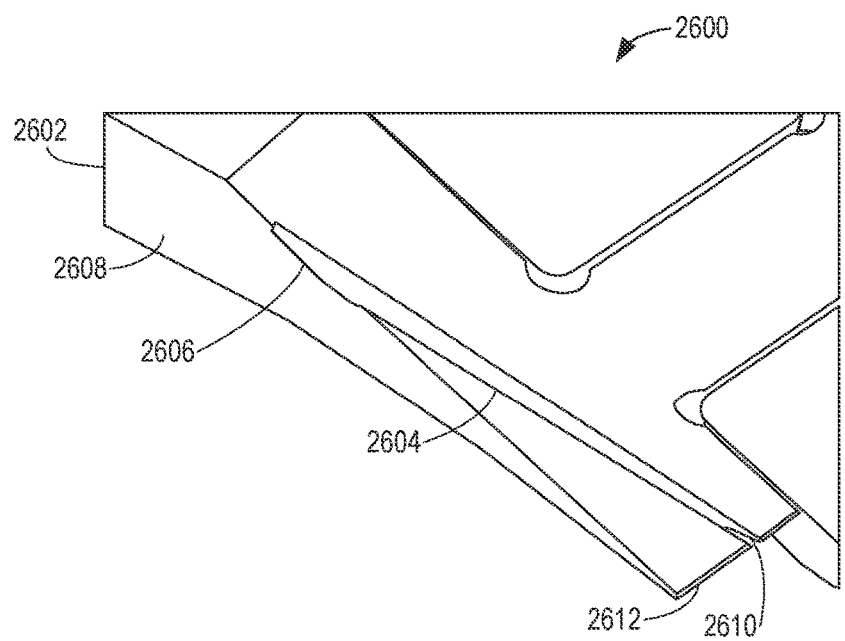
FIG. 26B is a schematic, radial cross-sectional view of the bearing assembly of FIG. 26A.

FIGS. 26A-26B illustrate another bearing assembly 2600 including another cage 2602 that may be utilized in the bearing assembly 100 of FIG. 2A and/or the bearing assembly 200 of FIG. 2B (e.g., the cage 102 of FIGS. 2A-2B). In particular, FIG. 26A is a schematic, axial cross-sectional view of the bearing assembly 2600. FIG. 26B is a partial perspective view of a radial cross-sectional view of the bearing assembly 2600.

The cage 2602 includes a tapered conduit 2604 extending between an inlet 2606 defined in an outer axial surface 2608 of the cage 2602 and an outlet 2610 defined in an inner radial surface 2612 of the cage 2602. The inlet 2606 includes a first cross-sectional area, and the outlet 2610 includes a second cross-sectional area smaller than the first cross-sectional area. The cross-sectional area in the tapered conduit 2604 gradually changes between the first cross-sectional area and the second cross-sectional area to form a pressure differential that pulls fluid (e.g., air) at the outer axial surface 2608 to the inner radial surface 2612. In turn, the fluid encounters the lubricant between the inner radial surface 2612 and a slanted portion of a cage landing (e.g., the second portion 2312 of the cage landing 2308 of FIG. 23, the second portion 2422 of the cage landing 2418 of FIG. 24). As a result, a mixture of the fluid and the lubricant exits the bearing assembly 2600 between the cage 2602 and the cage landing 2516.

In some examples, the bearing assembly includes first means for guiding. For example, the first means for guiding is implemented by the inner race 104, 804, 2304, 2414.

In some examples, the bearing assembly includes second means for guiding. For example, the second means for guiding is implemented by the outer race 112, 204, 806.

In some examples, the bearing assembly includes means for rolling between the first means for guiding and the second means for guiding. For example, the means for rolling is implemented by the roller bearings 510, 512, 1802, 1914.

In some examples, the bearing assembly includes means for containing the means for rolling. For example, the means for containing is implemented by the cage 502, 602, 702, 802, 1102, 1302, 1402, 1502, 1702, 1902, 2002, 2302, 2402, 2502, 2602.

In some examples, the bearing assembly includes means for transporting oil out of a cavity between a first means for rolling, a second means for rolling the inner race, and the means for containing. For example, the means for transporting is implemented by the conduit 514 (FIG. 5), the conduit 616 (FIG. 6), the conduit 720 (FIG. 7), the conduits 824 (FIGS. 8-10), the conduits 1110 (FIGS. 11-12), the conduit 1310 (FIG. 13), the conduits 1408 (FIG. 14), the conduits 1508 (FIG. 15), the conduits 1708 (FIG. 17), the grooves 1906, 2006 (FIGS. 19A-19B, 20) and the conduits 2102, 2112, 2122, 2132, 2202 (FIGS. 21A-21D, 22A-22B), and/or the tapered conduits 2316, 2404, 2504, 2604 (FIGS. 23, 24, 25, 26A-26B) and the cage landings 2308, 2418 (FIGS. 23 and 24).

In some examples, the cage includes means for maintaining at least a portion of the oil in the cavity. For example, the means for maintaining is implemented by the weir 610 (FIG. 6), the weir 704 (FIG. 7), the weir 822 (FIGS. 8 and 10), and/or the weir 1104 (FIGS. 11-12).

In some examples, the cage includes means for collecting at least a portion of the oil at an end of the means for transporting. For example, the means for collecting is implemented by the indentation 1304 (FIGS. 13-18) and the grooves 1906, 2006 (FIGS. 19A-19B, 20, 21A-21D, and 22A-B).

From the foregoing, it will be appreciated that systems, methods, apparatus, and articles of manufacture have been disclosed that drain lubricant out of a cavity defined between adjacent roller bearings, an inner race, and a bearing cage to reduce heat viscous and/or frictional heat generated by the lubricant during operation. As a result, the lubricant may help cool the bearing assembly. Further, by draining the lubricant from the bearing assemblies, the temperature of the bearings may be reduced, which enables smaller lubricant lines and/or heat exchangers to be associated with the bearing assemblies.

Lubricant draining bearing assemblies are disclosed herein. Further aspects of the present disclosure are provided by the subject matter of the following clauses:

An apparatus comprising a first race, a second race, roller bearings positioned between the first race and the second race to enable the first race to rotate relative to the second race, and a cage positioned around the roller bearings between the first race and the second race, the cage including a first radial surface, a second radial surface, and an axial surface, the first radial surface facing the first race, the second radial surface facing the second race, the axial surface facing away from the roller bearings, the cage including at least one conduit extending between the first radial surface and at least one of the second radial surface or the axial surface, the conduit defining a flow path for a fluid out of a cavity between the first race, the roller bearings, and the cage.

A bearing assembly comprising an inner race, an outer race, roller bearings positioned between the inner race and the outer race, and a cage positioned around the roller bearings between the inner race and the outer race, the cage including a conduit to enable a fluid to flow out of a cavity defined between the inner race, the roller bearings, and the cage, the cage including an inner radial surface, the inner radial surface including a first portion having a first depth and a second portion having a second depth different from the first depth.

A bearing assembly comprising first means for guiding, second means for guiding, means for rolling between the first means for guiding and the second means for guiding, and means for containing the means for rolling, the means for containing including means for transporting lubricant out of a cavity between the means for rolling, the first means for guiding, and the means for containing.

An apparatus comprising an inner race, an outer race, roller bearings positioned between the inner race and the outer race, and a cage positioned around the roller bearings between the inner race and the outer race, a first portion of the cage defined between the roller bearings in the axial direction, a second portion of the cage defined outside of the roller bearings in the axial direction, the cage including an inner radial surface, an outer axial surface, and an outer radial surface, the cage including a conduit extending from the inner radial surface in the second portion of the cage to the outer axial surface or the outer radial surface.

A bearing assembly comprising an inner race, an outer race, roller bearings positioned between the inner race and the outer race, and a cage positioned around the roller bearings between the inner race and the outer race, the cage including an inner radial surface, an outer radial surface, and a side surface facing an axial direction defined by the bearing assembly, the cage including a conduit having an outlet in the inner radial surface and an inlet in the outer radial surface or the side surface, the conduit tapered to define a first cross-sectional area proximate the inner radial surface and a second cross-sectional area proximate the outer radial surface or the side surface, the second cross-sectional area greater than the first cross-sectional area.

A bearing assembly comprising an inner race, an outer race, roller bearings positioned between the inner race and the outer race, and a cage positioned around the roller bearings between the inner race and the outer race, the cage including an inner radial surface, an outer radial surface, and a side surface facing an axial direction defined by the bearing assembly, the cage including a tapered conduit extending between (a) the inner radial surface and (b) the outer radial surface or the side surface.

The apparatus of any preceding clause, wherein the first radial surface includes a first portion having a first height and a second portion having a second height different from the first height.

The apparatus of any preceding clause, wherein the first height extends closer to a rotational axis of the first race than the second height, and wherein the first portion includes an inlet that fluidly couples the cavity to the conduit.

The apparatus of any preceding clause, wherein the first race includes cage landings on opposite sides of the roller bearings in an axial direction, and wherein the first portion of the first radial surface is positioned between the cage landings in the axial direction.

The apparatus of any preceding clause, wherein the first height extends closer to a rotational axis of the first race than the second height, and wherein the second portion includes an inlet that fluidly couples the cavity to the conduit.

The apparatus of any preceding clause, wherein the first race includes cage landings on opposite sides of the roller bearings in an axial direction, and wherein the second portion of the first radial surface is positioned between the cage landings in the axial direction.

The apparatus of any preceding clause, wherein the roller bearings are adjacent roller bearings, wherein a lengthwise span of the conduit is positioned between the adjacent roller bearings in a circumferential direction.

The apparatus of any preceding clause, wherein the roller bearings include a leading roller bearing adjacent to a trailing roller bearing, wherein the conduit defines an inlet in the first radial surface and an outlet in the second radial surface or the axial surface, and wherein the outlet is positioned closer than the inlet to the trailing roller bearing in a circumferential direction.

The apparatus of any preceding clause, wherein the conduit carries the fluid out of the cavity.

The apparatus of any preceding clause, wherein the conduit is substantially perpendicular to an axis around which the first race rotates.

The apparatus of any preceding clause, wherein the conduit is oblique relative to at least one of a radial direction or an axial direction.

The bearing assembly of any preceding clause, wherein the first depth extends closer to a rotational axis of the cage than the second depth, wherein the inner race includes cage landings on opposite sides of the roller bearings in an axial direction defined by the bearing assembly, wherein the first portion is positioned between the cage landings in the axial direction, and wherein the second portion is at least partially aligned with the cage landings in the axial direction.

The bearing assembly of any preceding clause, wherein the second depth extends closer to a rotational axis of the cage than the first depth, wherein the inner race includes cage landings on opposite sides of the roller bearings in an axial direction defined by the bearing assembly, wherein the first portion is positioned between the cage landings, and wherein the second portion is at least partially aligned with the cage landings in the axial direction.

The bearing assembly of any preceding clause, wherein the cage includes an outer radial surface and an outer axial surface, wherein the conduit includes an inlet defined in the inner radial surface and an outlet defined in the outer radial surface or the outer axial surface.

The bearing assembly of any preceding clause, wherein the roller bearings are adjacent roller bearings, wherein the conduit includes an inlet and an outlet in the cage between the adjacent roller bearings in a circumferential direction defined by the bearing assembly.

The bearing assembly of any preceding clause, wherein the inlet and the outlet are offset in a circumferential direction defined by the bearing assembly.

The bearing assembly of any preceding clause, wherein the inlet and the outlet are offset in an axial direction defined by the bearing assembly.

The bearing assembly of any preceding clause, wherein the means for containing includes means for maintaining at least a portion of the lubricant in the cavity.

The bearing assembly of any preceding clause, wherein the means for containing includes means for collecting at least a portion of the lubricant at an end of the means for transporting.

The apparatus of any preceding clause, wherein the roller bearings include a first roller bearing, and wherein the first radial surface includes an edge proximate the first roller bearing, wherein the second portion of the first radial surface includes a first section and a second section, the second section between the first section and the edge, wherein the first section includes a sharper height increase than the second section.

The apparatus of any preceding clause, wherein the roller bearings include a first roller bearing, and wherein the first radial surface includes an edge proximate the first roller bearing, wherein the second portion of the first radial surface defines an approximately constant height increase extending from the edge to the first portion of the first radial surface.

The apparatus of any preceding clause, wherein the cage includes a main body and an insert positioned in a void in the main body, wherein the insert defines the first portion of the first radial surface and the main body defines the second portion of the first radial surface.

The apparatus of any preceding clause, wherein the cage includes an axial groove defined in the inner radial surface in the first portion of the cage and extending in the axial direction, and a circumferential groove defined in the inner radial surface in the second portion of the cage and extending in a circumferential direction, wherein an end of the axial groove is in fluid communication with the circumferential groove, and wherein the conduit is in fluid communication with the circumferential groove.

The apparatus of any preceding clause, wherein the roller bearings include a first roller bearing, a second roller bearing, and a third roller bearing, wherein the axial groove includes a first axial groove between the first roller bearing and the second roller bearing, and a second axial groove between the second roller bearing and the third roller bearing, and wherein the circumferential groove is in fluid communication with the first axial groove and the second axial groove.

The apparatus of any preceding clause, wherein the roller bearings include a first roller bearing, a second roller bearing, and a third roller bearing, wherein the axial groove includes a first axial groove between the first roller bearing and the second roller bearing, and a second axial groove between the second roller bearing and the third roller bearing, wherein the circumferential groove includes a first circumferential groove in fluid communication with the first axial groove and a second circumferential groove in fluid communication with the second axial groove, and wherein the inner radial surface of the second portion includes a radially inward extension that separates the first circumferential groove from the second circumferential.

The apparatus of any preceding clause, wherein the axial groove includes a passageway between radially inward extensions, and wherein the radially inward extensions are positioned around the roller bearings.

The apparatus of any preceding clause, wherein the inner race includes landings on opposite sides of an inner raceway track in contact with the roller bearings, wherein the radially inward extensions define a first separation between the cage and the landings, and wherein the circumferential groove defines a second separation between the cage and the landings, the second separation greater than the first separation.

The apparatus of any preceding clause, wherein the conduit includes an inlet defined in the inner radial surface and an outlet defined in the outer radial surface.

The apparatus of any preceding clause, wherein the inlet is aligned with the outlet in the axial direction.

The apparatus of any preceding clause, wherein the inlet is positioned closer to the roller bearing than the outlet in the axial direction.

The apparatus of any preceding clause, wherein the outlet is positioned closer to the roller bearing than the inlet in the axial direction.

The apparatus of any preceding clause, wherein the outlet is positioned rearward of the inlet in a direction of rotation of the cage.

The apparatus of any preceding clause, wherein the conduit includes an inlet defined in the inner radial surface and an outlet defined in the outer axial surface.

The apparatus of any preceding clause, wherein the outlet is positioned rearward of the inlet in a direction of rotation of the cage.

The bearing assembly of any preceding clause, wherein the inner race includes a track and a landing, wherein the roller bearings roll along the track adjacent the landing, and wherein an outer radial surface of the landing or the inner radial surface of the cage includes an angled portion to increase a separation between the outer radial surface of the landing and the inner radial surface of the cage away from the roller bearings.

The bearing assembly of any preceding clause, wherein the landing includes the angled portion and a support portion adjacent to the angled portion, the support portion positioned between the angled portion and the roller bearing.

The bearing assembly of any preceding clause, wherein a transition in the landing from the support portion to the angled portion is defined between the outlet of the conduit and the roller bearings in the axial direction.

The bearing assembly of any preceding clause, wherein the conduit and the angled portion causes a pressure difference that pulls fluid through the conduit, and wherein the pressure difference pulls the fluid and lubricant from a cavity between the roller bearings, the cage, and the inner race in the axial direction between the cage and the landing.

The bearing assembly of any preceding clause, wherein a first area defined between the cage and the inner race at the angled portion forms a first pressure, and wherein a second area between the cage and the outer race forms a second pressure, wherein a third area between the roller bearings, the cage, and the inner race forms a third pressure, the second pressure and the third pressure greater than the first pressure.

The bearing assembly of any preceding clause, wherein the outlet of the conduit is in a leading position relative to the inlet in a direction of rotation of the cage.

The assembly of any preceding clause, wherein the roller bearings include a first roller bearing and a second roller bearing, wherein the outlet of the conduit is aligned with the first roller bearing in a circumferential direction defined by the bearing assembly, and wherein the inlet of the conduit is aligned between the first roller bearing and the second roller bearing in the circumferential direction.

The bearing assembly of any preceding clause, wherein the roller bearings include a first roller bearing and a second roller bearing, wherein the outlet of the conduit is aligned with the first roller bearing in a circumferential direction defined by the bearing assembly, and wherein the inlet of the conduit is aligned with the second roller bearing in the circumferential direction.

The bearing assembly of any preceding clause, wherein the inlet and the outlet are offset in a radial direction, an axial direction, and a circumferential direction defined by the bearing assembly.

The apparatus of any preceding clause, wherein the conduit carries the fluid out of the cavity.

The apparatus of any preceding clause, wherein the first height extends closer to a surface of the first race that contacts the roller bearings than the second height, and wherein the first portion includes an inlet that fluidly couples the cavity to the conduit.

The apparatus of any preceding clause, wherein at least one of the inlet or the outlet includes a circular cross-sectional area.

The apparatus of any preceding clause, wherein at least one of the inlet or the outlet includes an elliptical cross-sectional area.

The apparatus of any preceding clause, wherein the conduit is tapered.

The apparatus of any preceding clause, wherein the conduit includes a first cross-sectional area at the inlet and a second cross-sectional area at the outlet, and wherein the first cross-sectional area is greater than the second cross-sectional area.

The apparatus of any preceding clause, wherein the first height of the first radial surface defines a weir extending past an outer radial surface of the inner race.

The apparatus of any preceding clause, wherein the first height of the first radial surface defines an indent that is farther than the second height from an outer radial surface of the inner race.

The apparatus of any preceding clause, wherein the first height defines an extension into the cavity.

The apparatus of any preceding clause, wherein the first height defines an indent that increases a size of the cavity.

The foregoing examples of bearing assemblies can be used with rolling roller bearings to enable a shaft to rotate relative to a stationary part. Although each example bearing assembly disclosed above has certain features, it should be understood that it is not necessary for a particular feature of one example bearing assembly to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features discussed above and/or depicted in the figures.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
    an inner race;
    an outer race;
    roller bearings positioned between the inner race and the outer race, wherein the roller bearings include a leading roller bearing adjacent to a trailing roller bearing; and
    a cage positioned around the roller bearings between the inner race and the outer race, a cavity defined between the inner race, the roller bearings, and the cage, the cage including an inner radial surface, an outer radial surface, and an axial surface, the inner radial surface facing the inner race, the outer radial surface facing the outer race, the axial surface facing away from the roller bearings, the cage including at least one conduit extending between the inner radial surface and at least one of the outer radial surface or the axial surface, the conduit defining a flow path for a fluid out of the cavity, wherein a lengthwise span of the conduit is positioned between the leading roller bearing and the trailing roller bearing in a circumferential direction, wherein the conduit defines an inlet in the inner radial surface and an outlet in the outer radial surface or the axial surface, and wherein the outlet is positioned closer than the inlet to the trailing roller bearing in a circumferential direction.

2. The apparatus of claim 1, wherein the inner radial surface includes a first portion having a first height and a second portion having a second height different from the first height.

3. The apparatus of claim 2, wherein the first height extends closer than the second height to a rotational axis of the inner race, and wherein the first portion includes an inlet that fluidly couples the cavity to the conduit.

4. The apparatus of claim 3, wherein the inner race includes cage landings on opposite sides of the roller bearings in an axial direction, and wherein the first portion of the inner radial surface is positioned between the cage landings in the axial direction.

5. The apparatus of claim 4, wherein the second portion is positioned between the cage landings on opposite sides of the first portion in the circumferential direction.

6. The apparatus of claim 5, wherein the second portion includes an inclined surface that defines a transition from the first height to the second height.

7. The apparatus of claim 2, wherein the first height extends closer than the second height to a rotational axis of the inner race, and wherein the second portion includes an inlet that fluidly couples the cavity to the conduit.

8. The apparatus of claim 7, wherein the inner race includes cage landings on opposite sides of the roller bearings in an axial direction, and wherein the second portion of the inner radial surface is positioned between the cage landings in the axial direction.

9. The apparatus of claim 2, wherein the second height extends closer than the first height to a rotational axis of the inner race, and wherein the first portion includes an inlet that fluidly couples to the cavity.

10. The apparatus of claim 1, wherein the conduit carries the fluid out of the cavity.

11. The apparatus of claim 1, wherein the conduit is oblique relative to at least one of a radial direction or an axial direction.

12. The apparatus of claim 1, wherein the inlet and the outlet are offset in an axial direction.

13. A bearing assembly comprising:
an inner race;
an outer race;
adjacent roller bearings positioned between the inner race and the outer race; and
a cage positioned around the roller bearings between the inner race and the outer race, the cage including a conduit to transport a fluid to flow out of a cavity defined between the inner race, the roller bearings, and the cage, the cage including an inner radial surface, the inner radial surface including a first portion having a first depth and a second portion having a second depth different from the first depth, wherein the conduit includes an inlet and an outlet in the cage between the adjacent roller bearings in a circumferential direction defined by the bearing assembly, wherein the inlet and the outlet are offset in at least one of the circumferential direction or an axial direction defined by the bearing assembly.

14. The bearing assembly of claim 13, wherein the first depth extends closer than the second depth to a rotational axis of the cage, wherein the inner race includes cage landings on opposite sides of the roller bearings in an axial direction defined by the bearing assembly, wherein the first portion is positioned between the cage landings in the axial direction, and wherein the second portion is at least partially aligned with the cage landings in the axial direction.

15. The bearing assembly of claim 13, wherein the second depth extends closer than the first depth to a rotational axis of the cage, wherein the inner race includes cage landings on opposite sides of the roller bearings in an axial direction defined by the bearing assembly, wherein the first portion is positioned between the cage landings, and wherein the second portion is at least partially aligned with the cage landings in the axial direction.

16. The bearing assembly of claim 13, wherein the cage includes an outer radial surface and an outer axial surface, wherein the conduit includes an inlet defined in the inner radial surface and an outlet defined in the outer radial surface or the outer axial surface.

17. The bearing assembly of claim 13, wherein the inner race includes cage landings on opposite sides of the roller bearings in an axial direction defined by the bearing assembly, wherein the first portion and the second portion are positioned between the cage landings in an axial direction defined by the bearing assembly, and wherein the second portion is positioned on a first side of the first portion in the circumferential direction and a second side of the first portion in the circumferential direction opposite the first side.

18. A bearing assembly comprising:
first means for guiding;
second means for guiding;
means for rolling between the first means for guiding and the second means for guiding, the means for rolling including first means for rolling adjacent second means for rolling; and
means for containing the means for rolling, the means for containing including means for transporting lubricant out of a cavity between the means for rolling, the first means for guiding, and the means for containing, wherein the means for transporting directs the lubricant at least one of (i) from a first axial location to a second axial location different than the first axial location or (ii) from a first circumferential location to a second circumferential location different than the first circumferential location, wherein the first axial location, the second axial location, the first circumferential location, and the second circumferential location are positioned between the first means for rolling and the second means for rolling in a circumferential direction defined by the bearing assembly.

19. The bearing assembly of claim 18, wherein the means for containing includes means for maintaining at least a portion of the lubricant in the cavity.

20. The bearing assembly of claim 18, wherein the means for containing includes means for collecting at least a portion of the lubricant at an end of the means for transporting.

* * * * *